US008709148B2

(12) United States Patent
Trummer et al.

(10) Patent No.: US 8,709,148 B2
(45) Date of Patent: Apr. 29, 2014

(54) COLOURED GLASS PARTICLES, METHOD FOR THE PRODUCTION THEREOF AND USE THEREOF

(75) Inventors: Stefan Trummer, Nürnberg (DE); Ulrich Schmidt, Hersbruck (DE); Dirk Schumacher, Pegnitz (DE); Günter Kaupp, Neuhaus (DE); Christian Wolfrum, Erlangen (DE)

(73) Assignee: Eckart GmbH (DE)

( * ) Notice: Subject to any disclaimer, the term of this patent is extended or adjusted under 35 U.S.C. 154(b) by 52 days.

(21) Appl. No.: 13/131,344

(22) PCT Filed: Nov. 24, 2009

(86) PCT No.: PCT/EP2009/008347
§ 371 (c)(1),
(2), (4) Date: Jun. 28, 2011

(87) PCT Pub. No.: WO2010/060590
PCT Pub. Date: Jun. 3, 2010

(65) Prior Publication Data
US 2011/0251293 A1    Oct. 13, 2011

(30) Foreign Application Priority Data

Nov. 29, 2008 (DE) .......................... 10 2008 059 700

(51) Int. Cl.
*C04B 14/04* (2006.01)
(52) U.S. Cl.
USPC .......... 106/482; 106/31.6; 106/454; 106/457; 106/480; 106/489; 65/30.13; 977/773; 977/902; 501/11; 514/770; 524/430; 524/440

(58) Field of Classification Search
None
See application file for complete search history.

(56) References Cited

U.S. PATENT DOCUMENTS 2,662,035 A * 12/1953 Levi ................................. 106/34
2,671,033 A *  3/1954 Waggoner ..................... 428/384
3,165,821 A *  1/1965 Breton .......................... 428/409

(Continued)

FOREIGN PATENT DOCUMENTS

DE         4411104 A1    10/1995
DE       198 41 547 A1     3/2000

(Continued)

OTHER PUBLICATIONS

Kober, H. et al., "An Approach to a Surface Composition Analysis of Magnetic Coatings", IEEE Transactions on Magnetics, vol. 26, No. 1 (Jan. 1, 1990) pp. 165-167.*

(Continued)

*Primary Examiner* — Kaj K Olsen
*Assistant Examiner* — Ross J Christie
(74) *Attorney, Agent, or Firm* — Ostrolenk Faber LLP

(57) ABSTRACT

Particles colored with at least one colorant, where the colored glass particles are glass platelets with an average diameter of 1 to 500 μm and the colorants at least include at least one of metallic nanoparticles and metal oxides. The glass platelets are planar and the colorants are present in a concentration from 1% to 55% by weight, based on the total weight of the colored glass platelets. The disclosure further relates to a method to a method for producing the colored glass particles and to the use thereof.

39 Claims, 15 Drawing Sheets

(56) References Cited

U.S. PATENT DOCUMENTS

| | | | |
|---|---|---|---|
| 3,375,155 A * | 3/1968 | Adams | 501/35 |
| 3,484,224 A * | 12/1969 | Webster et al. | 65/30.14 |
| 4,056,643 A * | 11/1977 | Kume | 427/226 |
| 5,059,245 A * | 10/1991 | Phillips et al. | 106/31.65 |
| 5,135,812 A * | 8/1992 | Phillips et al. | 428/403 |
| 5,171,363 A * | 12/1992 | Phillips et al. | 106/31.65 |
| 5,707,436 A | 1/1998 | Fritsche et al. | |
| 6,279,351 B1 * | 8/2001 | Bresciani et al. | 65/135.9 |
| 6,440,208 B1 * | 8/2002 | Christie et al. | 106/415 |
| 6,582,764 B2 * | 6/2003 | Fuller et al. | 427/217 |
| 6,794,037 B2 * | 9/2004 | Zimmermann et al. | 106/415 |
| 6,800,125 B2 * | 10/2004 | Zimmermann et al. | 106/415 |
| 7,300,510 B2 * | 11/2007 | Seeger et al. | 106/401 |
| 7,413,599 B2 | 8/2008 | Henglein et al. | |
| 7,819,966 B2 | 10/2010 | Kaupp | |
| 2003/0072961 A1* | 4/2003 | Fuller et al. | 428/623 |
| 2003/0099834 A1 | 5/2003 | Erskine et al. | |
| 2003/0124763 A1* | 7/2003 | Fan et al. | 438/70 |
| 2004/0112253 A1* | 6/2004 | Zimmermann et al. | 106/415 |
| 2004/0115432 A1* | 6/2004 | Zimmermann et al. | 428/403 |
| 2004/0118157 A1 | 6/2004 | Borek et al. | |
| 2004/0168471 A1* | 9/2004 | Czarnetzki | 65/17.2 |
| 2005/0223940 A1* | 10/2005 | Seeger et al. | 106/31.86 |
| 2005/0243426 A1* | 11/2005 | Kimura et al. | 359/589 |
| 2006/0000389 A1* | 1/2006 | Duguet et al. | 106/404 |
| 2006/0293413 A1* | 12/2006 | Sapper | 523/171 |
| 2007/0208121 A1 | 9/2007 | Foulon et al. | |
| 2007/0225424 A1 | 9/2007 | Schulz et al. | |
| 2007/0269606 A1* | 11/2007 | Schwarte et al. | 106/493 |
| 2008/0035025 A1* | 2/2008 | Andrews | 106/400 |
| 2008/0090034 A1* | 4/2008 | Harrison et al. | 106/31.13 |
| 2008/0314284 A1* | 12/2008 | Li et al. | 106/31.9 |
| 2009/0056591 A1 | 3/2009 | Schmidt et al. | |
| 2010/0021565 A1 | 1/2010 | Handrosch et al. | |

FOREIGN PATENT DOCUMENTS

| | | |
|---|---|---|
| DE | 19841547 A1 | 3/2000 |
| DE | 10119302 A1 | 10/2002 |
| DE | 102005037612 A1 | 2/2007 |
| DE | 102006009130 A1 | 8/2007 |
| DE | 102006060997 A1 | 6/2008 |
| EP | 0289240 B1 | 4/1992 |
| EP | 1602632 A1 | 12/2005 |
| EP | 1510506 B1 | 4/2007 |
| EP | 1682622 B1 | 8/2007 |
| EP | 1837379 A2 | 9/2007 |
| JP | 59-199553 A | 11/1984 |
| JP | 59199553 A | 11/1984 |
| WO | WO 2004/056716 | 7/2004 |
| WO | WO 2005/063627 A1 | 7/2005 |
| WO | WO 2007/031151 A1 | 3/2007 |
| WO | WO 2007/140897 A1 | 12/2007 |
| WO | WO 2008/125857 A2 | 10/2008 |

OTHER PUBLICATIONS

BASF, The Chemical Company, Safety Data Sheet, Mearlin® Exterior CFS Fine Pearl 1303V.*

International Search Report dated Jan. 28, 2010, issued in corresponding international application No. PCT/EP2009/008347.

Hwang S C et al.: "Preparation method of high refractive index glass beads by ion exchange," WPI/Thomson, Bd. 2002, Nr. 64, Mar. 7, 2002. XP002491176.

Effect Pigments Technical Data Sheet, BASF The Chemical Company, Mearlin® Exterior CFS Fine Pearl 1303V, Jul. 2009.

* cited by examiner

COLOURED GLASS PARTICLES, METHOD FOR THE PRODUCTION THEREOF AND USE THEREOF

CROSS REFERENCE TO RELATED APPLICATIONS

The present application is a 35 U.S.C. §371 National Phase conversion of PCT/EP2009/008347, filed Nov. 24, 2009, which claims benefit of German Application No. 10 2008 059 700.7, filed Nov. 29, 2008, the disclosure of which is incorporated herein by reference. The PCT International Application was published in the German language.

TECHNICAL FIELD

The present invention relates to colored glass particles. The invention further relates to a method for producing these colored glass particles, and to the use thereof.

BACKGROUND

The coloring of utility glass with metallic nanoparticles and/or metal oxides is known.

On account of their particle size, which lies typically in the range from 1 to 100 nm, the metallic nanoparticles that are used as colorants for glass coloration have advantageous chemical and physical properties relative to conventional metals, examples being very high absorption coefficients (plasmon absorption) and a broad absorption band in the visible region of the electromagnetic spectrum, and hence an intense color.

The metal oxides that are also used as colorants, in contrast, have significantly lower absorption coefficients.

In the conventional coloring of glass, metals and/or metal salts are mixed with the other raw materials used for glassmaking, prior to the melting procedure. Customary raw materials for producing glass are quartz sand ($SiO_2$) as network former, sodium carbonate and potassium carbonate ($Na_2CO_3$, $K_2CO_3$) for lowering the melting point, and also feldspar, dolomite, lime, and recycled glass. In order to improve certain properties, red lead, borax or barium carbonate are sometimes added. Customary colorants for producing colored glass are oxides of iron (yellow to brown), copper (red to blue), chromium (green), uranium (yellow to green), cobalt (blue), nickel (reddish), manganese (brown), and selenium (red).

For glass coloration by means of metallic nanoparticles, metals or metal salts of the elements silver (yellow), copper (red), and gold (red) are added to the starting materials for glassmaking. The use of nanoparticles of gold is one of the oldest techniques for coloring glass, having already been used for many hundreds of years in order to produce what is called cranberry glass, for church windows, for example. For glassmaking in this context, the starting materials are mixed in any of a wide variety of proportions. Examples of commonplace glass compositions are so-called soda-lime glass ($SiO_2$ 72%, $Al_2O_3$ 2%, $Na_2O$ 14%, CaO 10%), float glass ($SiO_2$ 72%, $Al_2O_3$ 1.5%, $Na_2O$ 13.5%, CaO 8.5%, MgO 3.5%) or lead crystal glass ($SiO_2$ 60%, $Al_2O_3$ 8%, $Na_2O$ 2%, $K_2O$ 12%, PbO 17.5%).

The raw mixture is supplied to the melting operation. For this purpose, the mixture is heated in a first step until the materials melt, and then the gases formed are driven out by a further increase in temperature. The refined glass melt is then passed on for shaping. In conventional glass coloration, metallic colorants, such as metallic nanoparticles, for example, can be accommodated by the glass to be colored only up to an amount of approximately 0.1 percent by weight, based on the total mass of the glass, as is described, for example, in the dissertation by Thomas Rainer, Halle University, 2002, and in the literature cited therein.

The glass melt comprising metallic colorants is cooled and colored by a subsequent temperature treatment. In the course of this temperature treatment, nanoparticles are formed in the glass, and color the glass. The addition of colorant to the initial mixture prior to melting is also referred to as primary doping. With this technique of glass coloration, the colorants are distributed uniformly, as a result of the production process, throughout the volume of the glass.

In another known glass coloration procedure, the colorant is not introduced until after the melting operation, in other words into the solidified glass, by means of diffusion processes. This conventional glass coloring technique is also referred to as secondary doping. For this purpose, the glass to be colored is coated with a paste comprising the colorant, metal salts for example. During a subsequent temperature treatment, the colorant diffuses from the paste into the glass. The paste is subsequently removed from the cooled glass, and, by virtue of a further heat treatment, the glass is colored by the nanometric metal particles that form in the glass.

Another option to secondary diffusion is to mix the glass to be colored with the metallic colorants and to color the glass, doped with metallic colorants that have diffused into the glass from the mixture, by means of a subsequent heat treatment. A method of this kind is known from WO 2008/125857, for example. With this method, a disadvantage is that very high temperatures have to be applied, resulting in partial softening and, consequently, in partial deformation of the glass particles to be colored. Particularly in the case of glass platelets which are used as a substrate for producing effect pigments, more particularly pearlescent pigments, these deformations of the substrate result in a deterioration in the optical properties of the pearlescent pigments that are produced from them. It is therefore not possible to produce high-quality pearlescent pigments on the basis of colored glass platelets produced in accordance with the method of WO 2008/12857.

Also known is the doping of glass with metallic colorants by means of high-energy radiation (ion implantation). Since, however, this method is very energy-intensive, it is not employed in industrial production. Furthermore, it is not possible with this method to produce colored glass particles.

Known, for example, from DE 198 41 547 A1 is the coloring of utility glass by means of laser irradiation. For glassmaking with permanently colored structures, the glass is doped with metal ions, such as gold, copper, and silver, for example, and subsequently, by means of laser radiation, which causes no damage to the glass itself, the metal ions are reduced by local supply of energy, with oxidation of substances present within the glass. Through agglomeration, the reduced metals then form nanoparticles, which color the glass at the local sites. The method, however, can be employed only with flat glass, not with glass particles.

Furthermore, DE 101 19 302 A1 discloses a method for the laser-assisted introduction of metal ions through ion exchange and diffusion for the colored interior marking of glass for identification and advertising purposes. For this method, the glass surface, contacted with a material comprising metal ions, is heated locally by means of focused laser radiation, causing the metal ions to diffuse into the glass and be reduced to atoms. Through subsequent aggregation of the metal atoms to form metal particles, the glass is colored at the sites containing the metal particles. A method of this kind, however, can again be used only with flat glass, i.e., not with glass particles. Furthermore, in the glass sheets colored in this way, the metal nanoparticles are situated only in the outermost boundary layer of the glass, i.e., there is no uniform glass coloration in the depth.

WO 2007/031151 A1 relates to the production of colored glass. For this purpose, metal ions present in the glass or introduced are reduced by means of locally confined introduction of energy, by means of focused laser radiation, and are converted into a locally confined collection of metal particles, producing a local discoloration of the glass that is typical of the metal employed. In order to produce multicolor structures in the glass, in a first step, a plurality of locally confined regions with a monochromic initial coloration of different degrees of the same color is generated, and in a second step, as a result of a variable introduction of energy in the regions, particle formation processes and/or particle growth processes are induced that are dependent on the initial coloration, thereby giving the glass regions with a different regional coloration a different color. This method as well is not suitable for the production of colored glass particles.

JP 59199553 A, furthermore, relates to a glass which is filled with metal oxides or metal particles and which is subsequently encased. The metal oxides are, for example, chromium oxide and copper oxide; the metal particles consist of silver and gold, among others. The metal oxides and metal particles are added to the starting material and are therefore present only at low concentrations.

US 2003/0099834 A1 discloses photochromic glass nanoparticles comprising nanoparticles of silver halides which become dark on irradiation and become light again after the end of irradiation. The particles are precipitated from a microemulsion by precipitation. A disadvantage of the method is that, rather than coloredness, only a light/dark effect is generated. Furthermore, the microemulsion method is not suitable for the production of colored glass particles.

DE 44 11 104 A1 relates to a method for producing purple pigments on the basis of colloidal gold on firable support materials, in which, inter alia, an aqueous solution or suspension of a gold compound and a support material, consisting in particular of glass fluxes, are brought into contact with one another, and the mixture is subsequently treated thermally at a temperature above the decomposition temperature of the gold compound and below the sintering temperature of the support material, the gold compound being converted into colloidal gold. Disadvantages of the method, however, are that the gold is located merely on the surface of the substrate and not in its interior, making subsequent coatings very difficult, and that the gold is not protected by the glass from mechanical and/or chemical exposure.

EP 1 510 506 B1 discloses a glass flake with a specific glass composition and a low sodium fraction. A glass coating of gold is stated by way of example. A disadvantage, again, is that the gold is located on the surface and not in the interior of the substrate.

EP 1 837 379 A2 discloses a method for coloring glass platelets for use as fillers in cosmetics. For this purpose, inorganic colorants, especially cations or complex anions of the elements copper, chromium, manganese, iron, and cobalt, and/or a combination thereof, or titanium dioxide or elemental noble metals, are added to the glass melt. The glass platelets, which have a thickness of less than 1 µm and a particle size of 1 to 150 µm, can be used in blends with effect pigments in paints, varnishes, powder coatings, printing inks, plastics, and dry products, in cosmetic formulations and in decorative and care cosmetology, and also in lipophilic, hydrophilic or hydrophobic formulations. The colorants here are added to the original mixture, which is subsequently melted to produce the colored glass. This known glass coloration procedure has the major disadvantage that the metal introduced into the glass melt is soluble therein only to a level of around 0.1% by weight. The quantity figures reported in EP 1 837 379 A2 of 0.1-50% by weight of colorant in the glass platelets which are said to be obtained from a correspondingly colored glass melt are not correct. Through addition of metal compounds to the glass melt of glasses having an $SiO_2$ content of greater than 50%, only glasses with a maximum metal concentration of 0.1% can be produced. With a higher metal concentration in the glass melt, there are instances of metal deposition in the glass melt. Owing to the low thickness of the glass pigments, a concentration of 0.1% by weight of colorant is not sufficient to produce intensely colored glass pigments or intense colors. This known method is therefore unsuitable for the production of intensely colored glass.

Disadvantageously, to date, it has not been possible to produce intensely colored glass particles, in which, however, there is great economic interest and for which there is a hitherto unsatisfied demand.

SUMMARY

It is an object of the present invention to provide colored glass particles, more particularly colored glass platelets, having a hitherto unachieved color intensity and color variety. These colored glass particles, more particularly colored glass platelets, are also to have good mechanical stability and chemical resistance and to have diverse possibilities for processing—for example, they are to be coatable using known wet-chemical coating processes.

It is a further object of the invention to provide a simple method for producing colored glass particles having a hitherto unachieved color intensity and color variety.

The object on which the invention is based is achieved through provision of glass particles colored with at least one colorant, wherein the colored glass particles are glass platelets with an average diameter of 1 to 500 µm and the colorants comprise metallic nanoparticles and/or metal oxides or consist thereof, the glass platelets being planar and the colorants being present in a concentration from a range from 1% to 55% by weight, based on the total weight of the colored glass platelets.

Preferred developments of the invention are indicated in dependent claims 2 to 13.

The object has been achieved, furthermore, through provision of a method which allows the production of highly colored glass particles.

The method of the invention for producing colored glass particles comprises the following steps:
(a) contacting glass particles containing alkali metal oxide with a coloring metal salt melt, the coloring metal salt melt comprising at least one coloring metal salt and at least one agent which lowers the melting point of the coloring metal salt, and the temperature of the coloring metal salt melt being below the melting temperature of the glass particles, for a sufficient time to give colored glass particles,
(b) removing the colored glass particles obtained in step (a) from the coloring metal salt melt,
(c) optionally washing the colored glass particles removed in step (b),
(d) optionally drying the colored glass particles washed in step (c),
(e) optionally heating the colored glass particles obtained in step (b), (c) or (d), and
(f) optionally cooling and washing the colored glass particles heated in step (e).

Preferred developments of the method of the invention are indicated in dependent claims 15 to 27.

The object on which the invention is based is further achieved through provision of a composition, more particularly an effect pigment, paint, printing ink, varnish, coating material, powder coating material, plastic, ceramic, decorative and/or care cosmetic, agricultural film, food packaging, jewelry, art object, or decorative articles, the composition having or comprising colored glass particles of any of claims 1 to 13.

The object on which the invention is based is additionally achieved through provision of an article, the article being provided with colored glass particles of any of claims 1 to 13 or with a composition of claim 29, or having colored glass particles.

The article may be selected from the group consisting of bodywork, facade covering, packaging, paper, card, film, ceramic, jewelry, etc.

DETAILED DESCRIPTION

For the purposes of the invention, "colored" glass particles, colored glass platelets for example, also include "latently colored" glass particles, such as latently colored glass platelets, for example. By "latently colored" glass particles, such as latently colored glass platelets, for example, is meant that the coloring is only weak or is not yet perceptible, but becomes visible by means of a suitable aftertreatment, as for example by exposure to heat.

By "planar" and "planar colored glass platelets" is meant, for the purposes of the invention, that the colored glass platelets have no deformations, more particularly no depressions, elevations, creases, folds, displacements, etc., in their area. One of the distinguishing features of the colored glass platelets of the invention is that the top face and the bottom face of the glass platelets are ordered largely plane-parallel with respect to one another. The top and bottom faces of the colored glass platelets are preferably arranged plane-parallel to one another. Any deviation from the plane-parallelism may merely exist when the top and bottom faces of the glass platelets are not arranged plane-parallel to one another prior to coloring. Any such deviation, however, is not deformation as outlined above.

The inventors have, surprisingly, found that the provision of colored glass particles, more particularly of colored planar glass platelets, having excellent color intensity in diverse color variations, and also having good mechanical stability and chemical resistance, is possible. Extremely surprising in this context is that a high color intensity in glass particles, more particularly in glass platelets, can be achieved, since these particles/platelets have only a low volume or a low layer thickness.

In order to achieve this high color intensity in glass particles, more particularly in glass platelets, having a low volume or low layer thickness, the colorant must have a high concentration in the glass particles, more particularly in the glass platelets.

The colored glass particles of the invention are produced in two stages. First of all, the glass particles are produced from a glass melt via conventionally known processes, such as from EP 0 289 240 B1 or WO 2004/056716, for example, without addition of colorants to the glass melt. Subsequently, the glass particles thus produced are colored using the desired colorants.

This procedure offers a number of advantages over the direct coloring of the glass melt and the subsequent production of colored glass particles.

First, the physical properties, such as the viscosity or the surface tension, for example, of the glass melt are not altered by additions of colorants. The methods for generating the desired glass particles, more particularly of glass platelets, with a particular particle size distribution, layer thickness, etc., for example, can therefore be carried out without alteration, to give the desired quality in the glass particles being produced. Furthermore, there is no contamination with a colorant of the apparatus in which the glass melt is generated and, subsequently, the desired glass particles, more particularly glass platelets, are produced.

The colored glass particles provided in accordance with the invention differ structurally from colored glass particles from the prior art in terms inter alia of the high concentration of colorant in the glass particles. Surprisingly, on the basis of the present invention, it is possible to incorporate greater concentrations of colorant into the glass particles, as is the case for the direct coloring of glass melts and the subsequent production of glass particles.

The reason for this effect has not yet been explained. It is thought that the capacity of a glass melt to accommodate colorant is smaller than the capacity of solid glass particles, and hence of a subcooled melt.

A further structural difference from colored glass particles from the prior art is that the colored glass platelets of the invention are planar, thus having no deformation, more particularly no depressions, elevations, creases, folds, displacements, etc., in their surface.

In the case of coloring of glass particles in accordance with the method of WO 2008/125857, the glass particles are treated with a coloring salt at temperatures of 550° C. to 650° C. over a period of several hours, typically from about 4 to about 7 hours. Owing to the high temperatures and the long treatment time, there are instances of (partial) softening of the glass platelets. This (partial) softening results in partial deformation. Such deformation may be local or may lead to creases or angles in the surface of the colored glass platelets. The deformations come about as a result, for example, of the fact that the glass platelets to be colored lie one above the other during heating, and, on account of the (partial) softening of the glass platelets, they undergo mutual deformation, with, for example, the marginal region of a first glass platelet pressing into the surface of a second glass platelet and deforming it. Depressions and elevations may be produced by the corner of a first glass platelet pressing into the surface of a second glass platelet.

The colored glass platelets of the invention have substantially no deformations, preferably no deformations. The colored glass platelets of the invention have curvatures present essentially only even before coloring; preferably, the colored glass platelets of the invention are flat.

The provision of these planar colored glass platelets is made possible through the method of the invention. Among the features of the method of the invention are a lower temperature to be applied, and a substantially shorter duration. On account of the lower temperature and the substantially shorter duration, the glass particles, more particularly the glass platelets, do not soften, or not significantly, and so there are none of the instances of deformation as in the methods known from the prior art.

The colored glass platelets of the invention are in one preferred embodiment characterized in that the concentration profile of colorant in the colored glass platelet over the thickness of the colored glass platelet falls less than 10% by weight, preferably less than 5% by weight, is constant or is increased in the interior of the glass platelet relative to the marginal region of the glass platelet. By a marginal region here is meant the top and bottom outer faces of the glass platelet.

It is preferred for there to be no substantial drop, and preferably no drop, in the concentration of the colorant over the thickness of the glass platelet. Accordingly, in one preferred embodiment of the invention, the concentration of colorant over the thickness of the glass platelet is substantially constant, preferably constant.

In another preferred embodiment of the invention, there is, over the thickness of the glass platelet, at least an increase in concentration from the two outer faces to the interior of the glass platelet, preferably in the form of at least one peak, of colorant over the thickness of the glass platelet. In one preferred embodiment of the invention the concentration of colorant in the glass platelet is by up to 3%, preferably by up to 5%, more preferably by up to 8% by weight above the concentration of the colorant of the outer faces of the glass platelets.

The colored glass particles of the invention in the form of glass platelets preferably have a concentration profile in which the concentration of colorant increases from the outer faces over the thickness of the glass platelet in the direction of the interior or thickness center of the glass platelet, forming at least one concentration peak. Over the thickness of the glass platelet there may also be more than one concentration peak of colorant formed—for example, there may be two, three, four or more concentration peaks occurring. It is surprising, therefore, that the concentration of colorant at the outer faces of the glass platelet can be lower than in the interior of the glass platelets.

There has so far been no explanation as to why there is an increase in the concentration of the colorant in the interior of the glass platelet, as compared with the outer faces of the glass platelet.

The colorants, particularly in the case where coloring is by means of silver oxide and/or copper oxide or nanoparticulate silver and/or copper, are present in the colored glass platelets in an amount from a range from 1% to 55%, preferably from 1.5% to 50%, more preferably from 2% to 40%, and with particular preference from 2.5% to 35%, by weight, in the colored glass platelet. In a further variant of the invention, the amount of colorant in the glass platelet is in a range from 3% to 34%, more preferably from 3.5% to 32%, by weight.

It is preferred, furthermore, for the amount of colorant, particularly in the case of coloring by means of silver oxide or nanoparticulate silver, to be in a range from 11% to 55%, more preferably from 17% to 45%, even more preferably from 21% to 37%, by weight.

These concentration figures are based always on the total weight of the colored glass particles.

Below 1% by weight, the color strength is not sufficiently high. More than 55% by weight colorant fraction has not been hitherto producible.

The inventors suppose that the high concentrations of colorant(s) in the colored glass particles of the invention are attributable to a substitution of metal(s), metal ion(s) and/or metal oxide(s) for alkali metal ions in the glass particles. There is a limit, however, on the alkali content of glasses, and so as a result of this there is also a limit on the capacity of the glass particles to accommodate the colorant or colorants. Without wishing to be tied to any one theory, it is assumed that the maximum possible concentration of colorant in a glass particle is dependent on the amount of alkali metal ions in the glass particle prior to coloring. The higher the alkali metal ion content, the higher, supposedly, will be the capacity to accommodate colorants.

In the glass platelets of the invention the colorants are present preferably in the form of metallic nanoparticles.

The metallic nanoparticles in the glass platelets of the invention preferably have an average size of 1 to 200 nm, more preferably of 1.5 to 190 nm, and with particular preference of 2 to 150 nm. Having proven very suitable also are metallic nanoparticles within a size range with an average size of 5 to 100 nm or of 10 to 50 nm.

Below an average size of 1 nm, the metallic nanoparticles may not be sufficiently intense in color and may no longer be sufficiently chemically stable in order to be used reliably.

Above an average size of 200 nm for the metallic nanoparticles, it may be the case that the glass structure is largely disrupted and the glass platelets lose their specific shape or become too brittle.

The metallic nanoparticles in the colored glass platelets preferably have an approximately spherical or rodlet-shaped form.

The metallic nanoparticles are preferably selected from the group of gold, silver, copper, iron, chromium, cobalt, nickel, platinum, alloys of these metals, mixtures of these metals, and core-shell particles of these metals.

With particular preference, metallic nanoparticles are selected from the group consisting of gold, silver, copper, alloys of these metals, mixtures of these metals, and core-shell particles of these metals. On account of their so-called plasmon absorption, the aforementioned metals possess very high absorption coefficients, which allow intensive coloring of glass particles.

In another preferred embodiment of the invention, metal oxides are used for coloring the glass platelets. The metal oxides used are therefore colored, coloring, or can be converted into colored metal compounds, by means of heat treatment, for example.

According to one preferred embodiment, metal oxides used are the oxides of metals from the group consisting of gold, silver, copper, iron, chromium, cobalt, nickel, platinum, alloys of these metals, and mixtures of these metals.

With very great preference, use is made of silver oxide, copper oxides, chromium oxides and/or cobalt oxides.

In spite of the lower absorption of metal oxides as compared with the absorption of metallic nanoparticles, it is possible with metal oxides—on account of their high concentration and of the concentration profile within the glass platelets—for intensely colored glass platelets to be produced.

The colored glass platelets of the invention can be used directly as color pigments or can be used as a substrate for producing effect pigments of the invention. The effect pigments produced from the colored glass platelets are an essential subject of the present invention.

The glass platelets colored with colorants have diameters, preferably, from a range from 1.5 to 450 µm, preferably from 2 to 400 µm, and more preferably from 2.5 to 350 µm. Also very suitable are colored glass platelets having a diameter of 5 to 200 µm, or of 10 to 100 µm, of 10 to 35 µm or 1 to 15 µm.

According to one preferred development of the invention, the colored glass platelets are present in a particle distribution relative to the diameter of the glass platelets, the proportion of the planar glass platelets in the fraction $\geq D_{30}$ to $D_{100}$ of the particle distribution being at least 50%, based on the number of all the glass platelets in the fraction $\geq D_{30}$ to $D_{100}$.

It is preferred, furthermore, for the proportion of the planar glass platelets in the fraction $\geq D_{30}$ to $D_{100}$ of the particle distribution to be at least 60%, preferably at least 70%, more preferably at lest 80%, even more preferably at least 90%, even more preferably at least 95%, even more preferably at least 99%, preferably 100%, based on the number of all of the glass platelets in the fraction $\geq D_{30}$ to $D_{100}$.

It is preferred for the particle distribution to have a $D_{10} \geq 1$ μm and a $D_{90} \leq 500$ μm.

In a further preferred embodiment, the $D_{10}$ is in a range from 1.5 μm to 90 μm, more preferably from 2 μm to 80 μm. With further preference, the $D_{10}$ is in a range from 4 to 60 μm.

In a further preferred embodiment, the $D_{50}$ is in a range from 5 μm to 500 μm, more preferably from 10 μm to 250 μm. With further preference, the $D_{50}$ is in a range from 30 to 110 μm.

In a further preferred embodiment, the $D_{90}$ is in a range from 10 μm to 500 μm, more preferably from 20 μm to 400 μm. With further preference, the $D_{90}$ is in a range from 35 to 220 μm.

In one preferred embodiment the $D_{10}$ is in a range from 4 to 60 μm, the $D_{50}$ is in a range from 30 to 110 μm, and the $D_{90}$ is in a range from 35 to 220 μm.

By a $D_{10}$ value is meant that 10% of all of the glass platelets have a diameter which corresponds to or is below the stated value. Expressed differently, 90% of the glass platelets have a diameter which is above the stated value.

In the case of a $D_{50}$ value, 50% of the glass platelets have a diameter which is equal to or lower than the stated value, with the remaining 50% lying above the stated value. Correspondingly, the $D_{90}$ value indicates that 90% of the particles have a diameter which corresponds to the stated value or is smaller than the stated value.

The size distribution is determined typically via laser granulometry.

Furthermore, the glass platelets colored with colorants preferably have an average thickness from a range from 30 to 3000 nm, preferably 50 to 2500 nm, more preferably from 70 to 2000 nm, and very preferably from 80 to less than 1500 nm. Having also proven very suitable are colored glass platelets having an average thickness of 100 to 300 nm or of 120 to 250 nm.

In particular, thin glass platelets with an average thickness of below about 1000 nm have not been able satisfactorily to date to be colored intensively, on account of the low thickness. Metallic nanoparticles in particular have not been able to be incorporated to date in sufficiently great amount into such glass platelets, in order to allow intensive coloring.

According to the Lambert-Beer law, the absorbance is proportional to the path length and to the concentration of the colorants. It follows from this that, especially at low path lengths, high concentrations of colorant are necessary in order to achieve sufficiently high absorbances and hence colorations.

Preference is given to using glass platelets having a standard deviation in the thickness distribution of less than preferably less than 15%, and more preferably less than 10%. It has emerged that particularly clean-colored preparations of or with colored glass platelets can be obtained if the intensively colored glass platelets have a minimal deviation in the thickness distribution.

For coloring with the colorants it is particularly preferred to use glass particles, preferably glass platelets, which contain preferably 30% to 80% by weight of silicon oxide and/or preferably 5% to 20% by weight of alkali metal oxides, based on the weight of the glass particle, preferably glass platelet.

As illustrated above, it is supposed on the part of the inventors that in the course of coloring there is substitution of alkali metal ions from the initial glass material for metal(s), metal ion(s) and/or metal oxide(s).

It is a feature of the colored glass particles, preferably colored glass platelets, of the invention, therefore, that the amount of alkali metal ions, more particularly of the sodium ions, is reduced as compared with the alkali metal ion content, more particularly with the sodium ion content, of the initial glass material.

In one preferred embodiment of the invention, the amount of alkali metal oxide in the colored glass particles is in a range from 0% to 15%, preferably from 0.05% to 12%, more preferably from 0.08% to 8%, more preferably still from 0.1% to 3.5%, even more preferably from 0.13% to 1%, even more preferably from 0.15% to 0.5%, by weight, based in each case on the total weight of the colored glass particles. In one very preferred embodiment the amount of alkali metal ions, more particularly of Na ions, is virtually zero, preferably zero.

The colored glass particles of the invention, more particularly colored glass platelets, therefore have an unusual glass composition, since the alkali metal ion content, more particularly the sodium ion content, is greatly reduced, and yet the other constituents are, in terms of their absolute amounts—for example, the absolute amount of $SiO_2$, $Al_2O_3$, $B_2O_3$, CaO, PbO, $TiO_2$, etc., where present in the particular glass type—are substantially unchanged, preferably unchanged, based in each case on the respectively absolute amount in the initial material.

It has emerged that, with a silicon oxide content of 30% to 80%, preferably of 35% to 75%, by weight in the initial glass material, the colored glass particles, preferably colored glass platelets, possess, after coloring, very good mechanical strength and also chemical resistance. The alkali metal ions are preferably selected from the group consisting of sodium ions, potassium ions and/or lithium ions. In one very preferred embodiment, the alkali metal ions are sodium ions.

With further preference, the glass particles, preferably glass platelets, for use as starting material in accordance with the invention contain 3% to 25% by weight of aluminum oxide and/or 5% to 30% by weight of calcium oxide, based in each case on the total weight of the glass particle, preferably glass platelet, prior to coloring.

The initial glass material is selected preferably from the group consisting of soda-lime glass, float glass, lead-crystal glass, laboratory glass, enamel, and mixtures thereof. Exemplary glass compositions which can be used in the present invention are indicated in table 1; the values indicated in table 1 for the respective oxides in each type of glass, where present, may vary, in relation to the amount:

of $SiO_2$ by up to ±8% by weight, preferably by up to ±5% by weight, of $Al_2O_3$ by up to ±1.5% by weight, preferably by up to ±1% by weight, of ($Na_2O+K_2O$) in sum total by up to ±4% by weight, preferably by up to ±3% by weight, of MgO by up to ±1% by weight, preferably by up to ±0.5% by weight, of CaO by up to ±4% by weight, preferably by up to ±2% by weight, of $B_2O_3$ by up to ±2% by weight, preferably by up to ±1% by weight, of PbO by up to ±6% by weight, preferably by up to ±3% by weight, of $TiO_2$ by up to ±4% by weight, preferably by up to ±2% by weight, of F by up to ±4% by weight, preferably by up to ±2% by weight.

TABLE 1

Compositions of different glass types

| Glass type | SiO$_2$ | Al$_2$O$_3$ | Na$_2$O | K$_2$O | MgO | CaO | B$_2$O$_3$ | PbO | TiO$_2$ | F |
|---|---|---|---|---|---|---|---|---|---|---|
| Soda-lime glass | 72% | 2% | 14% | — | — | 10% | — | — | — | |
| Float glass | 72% | 1.5% | 13.5% | — | 3.5% | 8.5% | — | — | — | |
| Lead-crystal glass | 58% | — | 4% | 9% | — | — | 2% | 24% | — | |
| Laboratory glass | 80% | 3% | 4% | 0.5% | — | — | 12.5% | — | — | |
| Enamel | 40% | 1.5% | 9% | 6% | 1% | — | 10% | 4% | 15% | 13% |

The figures in [%] denote [% by weight], based in each case on the total weight. Besides the constituents indicated, there may also be further components or possible impurities present. The sum of all the components, including any impurities, is 100% by weight for each glass type The glass platelets colored in accordance with the present invention are produced by methods familiar to the skilled person and described in, for example, WO 2007/140897, EP 1 837 379 A2, EP 0 289 240 A1 or WO 2005/063627 A1, the content of which is hereby incorporated by reference.

The subject matter of the invention also encompasses the use of the glass platelets of the invention with high color intensity that are colored with colorants, preferably having one or more coatings, preferably inorganic and/or organic-chemical surface coatings.

In one embodiment of the invention it is preferred for the at least one coating to comprise or consist of a material or a plurality of materials selected from the group consisting of metals, metal chalcogenides, more particularly metal oxides, metal hydroxides, metal suboxides, metal oxide hydrates, metal sulfides, and also metal fluorides, metal nitrides, metal carbides, and also mixtures thereof and combinations thereof.

The colored glass platelets of the invention are preferably coated with one or more high- and/or low-refractive-index metal oxide layers. In one preferred development of the invention, the colored glass platelets are provided with one (number: 1) or two high-index coating(s), especially titanium oxide and/or iron oxide. Applied to this high-index coating there may then be, optionally, one or more protective layers and/or organic-chemical surface modifications.

The high-index metal oxide layers preferably have a refractive index ≥1.8.

The high-index metal oxide layers are selected preferably from the group consisting of TiO$_2$, Fe$_2$O$_3$, Fe$_3$O$_4$, TiFe$_2$O$_5$, ZnO, SnO$_2$, CoO, CO$_3$O$_4$, ZrO$_2$, Cr$_2$O$_3$, VO$_2$, V$_2$O$_3$, (Sn, Sb)O$_2$, FeTiO$_3$, mixtures thereof, and combinations thereof.

Furthermore, the colored glass particles, preferably colored glass platelets, of the invention may also be coated with what is called a multiple coating. This coating preferably has the following construction:

(A) a layer having a refractive index n >1.8 and an average thickness of 50-350 nm,
(B) a layer having a refractive index n <1.8 and an average thickness of 50-500 nm,
(C) a layer having a refractive index n >1.8 and an average thickness of 20-350 nm.

The thicknesses of the layers (A), (B) or (C) in this construction may independently of one another be the same or different. It will be appreciated that this layer construction may also repeat itself. It is also possible for different layers and additional layers to be applied in order, for example, to modify or enhance interference phenomena, reflectances, and/or processing properties.

More preferably the layer thicknesses (A) and (C) are situated preferably in the range of 20-350 nm, more preferably at 50-250 nm, and even more preferably at 70-150 nm.

The low-index layer (B) has a preferred thickness of 50-500 nm, more preferably of 100-200 nm, and even more preferably of 130-180 nm, and comprises preferably substantially or consists preferably of B$_2$O$_3$, SiO$_2$ and/or Al$_2$O$_3$. In one preferred embodiment the low-index layer is silicon oxide, preferably SiO$_2$.

The layers (A) and (C) comprise preferably substantially or consist preferably of TiO$_2$ and/or Fe$_2$O$_3$. The TiO$_2$ here may be in the rutile or anatase modification, but more preferably in the rutile form.

If the layer is to consist of rutile TiO$_2$, it is preferred to apply a thin layer of SnO$_2$ or Fe$_2$O$_3$ prior to TiO$_2$ deposition. A layer of this kind of SnO$_2$ or Fe$_2$O$_3$ has the effect that the TiO$_2$ is deposited directly in the rutile crystal structure. The thickness of this preliminary coating of SnO$_2$ or Fe$_2$O$_3$ is preferably <10 nm and more preferably <5 nm.

Preferred examples of multilayer coating sequences based on planar colored glass platelets of the invention are as follows:

colored glass platelet+TiO$_2$+SiO$_2$+TiO$_2$
colored glass platelet+Fe$_2$O$_3$+SiO$_2$+TiO$_2$
colored glass platelet+TiO$_2$+SiO$_2$+Fe$_2$O$_3$
colored glass platelet+TiO$_2$+SiO$_2$+TiO$_2$/Fe$_2$O$_3$
colored glass platelet+TiO$_2$/Fe$_2$O$_3$+SiO$_2$+TiO$_2$/Fe$_2$O$_3$
colored glass platelet+TiO$_2$/Fe$_2$O$_3$+SiO$_2$+TiO$_2$
colored glass platelet+TiO$_2$/Fe$_2$O$_3$+SiO$_2$+Fe$_2$O$_3$
colored glass platelet+Fe$_2$O$_3$+SiO$_2$+TiO$_2$/Fe$_2$O$_3$
colored glass platelet+SiO$_2$+TiO$_2$+SiO$_2$+TiO$_2$
colored glass platelet+SiO$_2$+Fe$_2$O$_3$+SiO$_2$+TiO$_2$
colored glass platelet+SiO$_2$+TiO$_2$+SiO$_2$+TiO$_2$/Fe$_2$O$_3$
colored glass platelet+SiO$_2$+TiO$_2$/Fe$_2$O$_3$+SiO$_2$+TiO$_2$/Fe$_2$O$_3$
colored glass platelet+SiO$_2$+TiO$_2$/Fe$_2$O$_3$+SiO$_2$+TiO$_2$
colored glass platelet+SiO$_2$+TiO$_2$/Fe$_2$O$_3$+SiO$_2$+Fe$_2$O$_3$
colored glass platelet+SiO$_2$+Fe$_2$O$_3$+SiO$_2$+TiO$_2$/Fe$_2$O$_3$ The colored glass platelets in accordance with the present invention may be referred to, with or without aftercoating, as for example of low- and high-index metal oxides and/or organic-chemical aftercoating, as effect pigments or glass pigments.

A further subject of the invention are colored glass platelets, which may also be referred to as colored glass pigments, with a colored glass platelet coated on one or both sides with transparent and/or semitransparent metal layers. These metal layers comprise metals selected preferably from the group consisting of silver, aluminum, chromium, nickel, gold, platinum, palladium, copper, zinc, and mixtures and alloys thereof.

The colored glass platelets or glass pigments of the invention may optionally be provided with protective layers, to give weathering-resistant and/or UV-resistant colored glass platelets or glass pigments.

The protective layers are preferably selected from oxides, hydroxides and/or oxide hydrates of the elements silicon, zirconium, cerium and/or aluminum. In this context, with further preference, at least two layers of different oxides are applied, with all possible combinations of layers of the aforementioned metal oxides being possible. It is particularly preferred to apply first a cerium oxide layer followed by an $SiO_2$ layer, since this layer combination has emerged as being the most effective. In one preferred development of the invention, the $SiO_2$ layer is applied directly to the cerium oxide layer. A layer sequence of this kind is disclosed in EP 1 682 622 B1, the content of which is hereby incorporated by reference.

In order, especially in coatings applications, to produce compatibility with the surrounding binder medium, the colored glass platelets of the invention, with or without further low- and high-index metal oxide layers, are, in a further preferred embodiment, provided finally with an organic-chemical surface modification of one or more organofunctional silanes, aluminates, zirconates and/or titanates, as disclosed in DE 10 2006 009 130 A1, or of at least one organic phosphorus-containing compound, as disclosed in DE 10 2005 037 612 A1. The contents of DE 10 2006 009 130 A1 and of DE 10 2005 037 612 A1 are hereby incorporated by reference.

In a further advantageous embodiment, the colored glass platelets of the invention have a coating comprising color pigments.

Details of the production and composition of an advantageous pigment coating are described comprehensively in, for example, DE 10 2005 037 612 A1, DE 10 2006 009 130 A1, and WO 2007/140897 A1, the contents of which are hereby incorporated by reference.

The colored glass platelets of the invention have a coloredness and color diversity which is hitherto unattained with commercially customary glass pigments.

Relative to a surface-colored glass particle, the colored glass platelets of the invention are distinguished by a significantly increased resistance toward mechanical and chemical stress, similar to that of an uncolored glass particle.

Deserving of emphasis is the excellent light stability of the colored glass platelets of the invention. This advantageous light stability is achieved through the use of colorant based on pure metallic nanoparticles or metal oxides. These metallic nanoparticles or metal oxides are not attacked or chemically degraded by UV light, in contrast to organic colorants.

The colored glass platelets of the invention also have a thermal stability up to a temperature of approximately 400° C.

As a result of the use of absorber colorants in the form of metallic nanoparticles or metal oxides, the colored glass platelets of the invention exhibit a non-angle-dependent coloredness, in contrast to conventional pigments, for example in described interference pigments. The colored glass platelets of the invention may optionally be provided with an additional coating which induces interference effects.

The colored glass platelets of the invention, and also the effect pigments produced on the basis of thin, colored glass platelets, can be employed with particular advantage for automobile applications, more particularly for use in autofinishes, since here the thicknesses of the basecoat films are very small (12-15 μm), with a trend to even smaller film thicknesses. Moreover, an effect pigment produced on the basis of colored glass platelets has a better size (diameter)-to-thickness ratio (aspect ratio) and, as a result, an improved parallel orientation to the substrate. The improved aspect ratio derives from the fact that the colored glass platelets of the invention and effect pigments produced therefrom have a very small thickness in relation to the size/diameter. The aspect ratio is situated preferably within a range from 2000:1 to 10:1, preferably from 1000:1 to 20:1, more preferably from 500:1 to 25:1.

The method of the invention for producing colored glass particles comprises the following steps:
(a) contacting glass particles containing alkali metal oxide with a coloring metal salt melt, the coloring metal salt melt comprising at least one coloring metal salt and at least one agent which lowers the melting point of the coloring metal salt, and the temperature of the coloring metal salt melt being below the melting temperature of the glass particles, for a sufficient time to give colored glass particles,
(b) removing the colored glass particles obtained in step (a) from the coloring metal salt melt,
(c) optionally washing the colored glass particles removed in step (b),
(d) optionally drying the colored glass particles washed in step (c),
(e) optionally heating the colored glass particles obtained in step (b), (c) or (d), and
(f) optionally cooling and washing the colored glass particles heated in step (e).

The method of the invention is extremely simple and leads to reliably intensively colored glass particles.

One of the features of the method of the invention is that at least one agent which lowers the melting point of the coloring metal salt is added to the coloring metal salt. As a result of this addition, a eutectic mixture, preferably a eutectic, is provided which is present as a melt at a relatively low temperature, as compared with the melting point of the pure coloring metal salt. The temperature of the eutectic mixture is more particularly below the decomposition temperature of the metal salts.

One of the results of using a eutectic mixture, preferably a eutectic, is to lower the energy consumption. In addition, the glass particles, more particularly the glass platelets, are colored at a lower temperature, which means that there is no substantial deformation, and preferably no deformation, of the glass particles, more particularly of the glass platelets. Therefore, glass platelets in particular retain their planarity. Using the planar colored glass platelets produced in this way it is possible, by subsequent coating with optically active materials, examples being high-index metal oxides such as titanium oxide and/or iron oxide, to produce pearlescent pigments having outstanding optical properties. Since the glass platelets colored in accordance with the invention have no substantial deformation, and preferably no deformation, as already illustrated above, there are no significant unwanted scattering or light reflection or interference phenomena. The entirety of the effect pigments thus produced therefore have a uniform and reproducible quality.

Surprisingly, the treatment time for coloring is extremely short, there being to date no explanation for this phenomenon. The coloring time of the glass particles, preferably glass platelets, is generally less than 90 minutes, preferably less than 60 minutes, more preferably less than 30 minutes. A time of 2 to 20 minutes, preferably of 5 to 15 minutes, has proven, surprisingly, to be sufficient in order to bring about deep coloration of the glass particles, preferably of the glass platelets. It has been found, surprisingly, that the sodium ions are removed from the glass particles used, more particularly glass platelets, within a few minutes and the colorant has penetrated the glass particles.

The glass particles may be glass platelets or spherical or irregularly shaped glass particles.

The spherical or irregularly shaped glass particles are preferably in a size range of 1 to 3000 μm, more preferably of 1.5-1000 μm, even more preferably of 5-500 μm, and very preferably of 10-300 μm, more preferably of 50 μm to 250 μm.

In one preferred embodiment, the colored glass particles are colored glass balls having an average size of 1 to 3000 μm, more preferably of 1.5-1000 μm, even more preferably of 5-500 μm, and more preferably of 10-300 μm, more preferably of 50 μm to 250 μm. Colored glass balls of this kind constitute small "glass beads", which if desired may also be provided with a hole, in order that they can be strung to form a chain, on a thread or wire, for example. These colored glass beads may also be used as labeling or marking means, as for example in coating materials, such as inks, paints, traffic markings, etc., or on guiderails, street posts, road signs, etc.

Glass beads with this kind of intense coloration have not hitherto been obtainable, and can also be used as costume jewelry, as decoration, and as substitute pearls for natural pearls from bivalves.

In one preferred embodiment, the colored glass balls or glass beads have a ball or bead diameter of up to 3000 μm. Above a size of 3000 μm it may be the case that the coloration is somewhat less intensive, if the coloring metal ions do not penetrate so deeply into the glass particle—a glass ball, for example. At a size of 3000 μm and smaller, intense coloration or through-coloration of the glass particles is easily possible.

Since the method of the invention can be used for coloring spherical, irregularly shaped and/or platelet-shaped glass particles, reference is made below, generally, to glass particles. The glass particles, preferably, are more particularly glass platelets, and as regards the more detailed specification of the glass particles, such as the distribution of the diameters of the glass platelets, etc., for example, reference is made to the above details concerning the colored glass platelets, which apply correspondingly in relation to the details concerning the method of the invention.

The contacting of glass particles containing alkali metal oxide, more particularly of glass particles containing sodium ions, with a coloring metal salt melt can be accomplished by suspending the alkali metal oxide-containing glass particles in a coloring metal salt melt. The alkali metal oxide-containing glass particles, more particularly sodium ion-containing glass particles, may also, alternatively, first be combined with a coloring metal salt and the resulting combination can be heated until the metal salt melts.

The alkali metal oxide-containing glass particles, preferably containing sodium ions, are held in contact with the metal melt for a sufficient time. This time may be varied in dependence on the size of the alkali metal oxide-containing glass particles, the type of glass, the temperature set for the metal salt melt, and the desired intensity of coloration. In any case, the temperature of the glass melt is below the melting temperature of the glass particles to be colored. The metal salt mixture is advantageously stirred during the coloring of the glass particles.

The removal of the colored glass particles from the metal salt melt may be accomplished, for example, by filtration of the metal salt melt. It is, however, also possible to dissolve the cooled metal salt melt in a solvent, water for example, and then to remove the colored glass particles from the salt solution.

The colored glass particles obtained may optionally be washed in a solvent, preferably water, and then optionally dried. Following drying or directly after washing, or directly after contacting with the coloring metal salt melt, the glass particles thus treated may be heated. The heating of the colored glass particles or of the glass particles treated with the metal salt melt may result in an intensification of the color of the colored glass particles. After heating, the generally intensively colored glass particles are cooled and can optionally be cleaned by being contacted with a solvent, preferably water.

In the method of the invention, the uncolored glass particle is preferably contacted with a melt comprising at least two metal salts. These salts preferably comprise at least one coloring and at least one noncoloring metal salt. The at least one noncoloring metal salt here serves as an agent for lowering the melting temperature of the coloring metal salt, and hence for the provision of the eutectic mixture, preferably eutectic.

By a "coloring metal salt" in accordance with the invention is meant a metal salt which contains cations which are capable of penetrating into the glass platelet and forming therein a metallic colored nanoparticle and/or colored metal oxide.

The coloring metal salts preferably comprise ions, preferably cations, selected from the group consisting of gold, silver, copper, iron, cobalt, chromium, selenium, nickel, manganese, uranium, and alloys and mixtures thereof. As anions, the coloring metal salts preferably comprise halides, sulfates, nitrates and/or oxides.

In these salts, the metal may in each case be present in any of the known oxidation states. Thus, for example, copper may be present in the copper(I) and copper(II) forms as $CuCl$ or $CuCl_2$. Gold ions may be present, for example, in the oxidation states (I) or (III), iron ions in the oxidation states (II) or (III), and chromium ions in the oxidation states (III) or (VI).

Examples of preferred coloring metal salts are as follows: $AgNO_3$, $CuCl_2$, $CuBr_2$, $CuI_2$, $AgCl$, $AgBr$, $AgI$, $CuSO_4$, $CoSO_4$, $AG_2SO_4$, $CoCl_2$, $HAuCl_4$, $KAuCl_4$ or mixtures thereof.

When these coloring metal salts are used, especially under reducing conditions, preferably metallic nanoparticles are present in the glass particle.

With further preference, coloring metal salts used are $Na_2Cr_2O_7$, $FeCl_3$, $FeSO_4$ or mixtures thereof. These salts produce, preferably, metal oxides such as $Fe_2O_3$ or $Cr_2O_3$.

A "noncoloring metal salt" means a metal salt which does not induce coloring of the glass particles in the method of the invention. The addition of a noncoloring metal salt to the metal salt melt is accompanied by great advantages.

For instance, by means of the noncoloring metal salt component, for example, as already illustrated above, it is possible to lower the melting point of the salt mixture by formation of a eutectic, and/or to reduce the amount of metal salt used. Likewise, the noncoloring metal salt may find use as a reducing or oxidizing agent or as an auxiliary material for improving the phase transition, or as a stabilizer for the coloring metal salt component present in the glass melt.

In one particularly preferred embodiment of the invention, the glass coloration takes place with a salt mixture which has a lower melting point than its individual components. With further preference, this mixture is a eutectic mixture or an approximately eutectic mixture of metal salts.

The noncoloring metal salt comprises cations selected preferably from the group consisting of sodium, potassium, lithium, calcium, magnesium, titanium, and mixtures thereof.

As anions, the noncoloring metal salt comprises preferably sulfates, sulfides, nitrates, nitrites, halides and/or oxides.

With further preference, in step a), a metal salt melt is used that comprises at least one noncoloring metal salt such as sodium nitrate ($Na_2NO_3$), sodium sulfate ($Na_2SO_4$), sodium chloride (NaCl), lithium chloride (LiCl) and/or potassium chloride (KCl).

The glass particles to be colored are selected preferably from the group consisting of glass platelets, glass balls, glass shards, irregularly shaped glass particles, and mixtures thereof.

The ratio of coloring metal salt to noncoloring metal salt may be varied in line with the degree of coloration and/or the coloring time and the temperature. The proportion (weight/ weight) of noncoloring metal salt to coloring metal salt may exhibit a broad range from 100:1 to 1:100, more preferably from 50:1 to 1:50, based in each case on the weight. A proportion (weight/weight) of noncoloring metal salt to coloring metal salt that has proven very suitable is from 10:1 to 1:10.

The glass platelets colored and to be colored by means of the method of the invention have a diameter of 1 to 500 µm, preferably of 1.5 to 450 µm, more preferably of 2 to 400 µm, and very preferably of 2.5 to 350 µm. The average thickness of the glass platelets is preferably in a range from 30 to 3000 nm, preferably 50 to 1500 nm, more preferably 70 to 500 nm, and very preferably from 80 to less than 350 nm. Having proven very suitable are also glass platelets, both colored and to be colored, with an average thickness of 100 to 300 nm or of 120 to 250 nm.

The melting of the metal salt mixture may be carried out in principle in any suitable melting device.

The metal salt mixture is preferably first homogenized in a suitable container by mechanical input of energy, and then heated in a temperature-resistant container, such as a ceramic crucible or a trough, for example, with supply of heat. The input of energy is accomplished either by introducing the container into a heated chamber, such as an oven, for example, or by directly heating the walls of the container. Also possible is a supply of energy by means of radiation, e.g., infrared radiation or microwave radiation.

In a further, preferred embodiment of the method of the invention, step a) is carried out under inert gas, comprising, for example, nitrogen and/or argon, or under reactive gas compositions, examples being argon/oxygen or nitrogen/hydrogen mixtures. The proportion of the reactive gas in these mixtures may be 0% to 99%, preferably 0.5% to 50%, very preferably 0.8% to 30% by volume.

The contacting in step (a) of glass particles, preferably glass platelets, to be colored and metal salt melt takes place preferably at a temperature in a range from 100° C. to 1000° C., preferably from 170° C. to 700° C., and more preferably from 250° C. to 650° C., even more preferably from 310 to 610° C.

The duration of the contacting of glass particles to be colored and metal salt melt, and hence the incorporation reaction that takes place, is preferably a few minutes, but may also be several hours, such as hours, for example. A method duration of several hours, however, is less preferred in accordance with the invention, in view of the energy consumption and the risk of deformation of the glass particles. In the case of a method duration of several hours, therefore, the temperature would have to be set at such a low level that there was no deformation of the glass particles, more particularly of the glass platelets. With this procedure, however, the method duration is undesirably prolonged. In accordance with the invention, the duration is preferably only 2 to 90 minutes, more preferably 5 to 30 minutes, since, first, the energy consumption is significantly lowered and, second, the glass particles, more particularly the glass platelets, are not deformed.

With this coloration, metal ions from the metal salt mixture diffuse into the glass particles to be colored, preferably glass platelets, and alkali metal ions, more particularly sodium ions, diffuse from the glass particles, preferably glass platelets, into the metal salt mixture, as illustrated above.

The metal ions are subsequently reduced in the glass, and form nanoparticulate metal particles. Cumulatively or alternatively, the metal ions are oxidized to form metal oxide.

Depending on the external conditions selected, more particularly on the gas atmosphere selected, it is possible to obtain predominantly, preferably exclusively, metallic nanoparticles or exclusively metal oxides. Under an oxidative gas atmosphere, metal oxides are generated predominantly, preferably exclusively, in the glass particles to be colored. Under a reductive gas atmosphere, metallic nanoparticles are generated predominantly, preferably exclusively, in the glass particles to be colored.

The removal, carried out subsequently in step (b), of the glass particles, preferably glass platelets, doped with coloring metal particles from the metal salt mixture may be accomplished, for example, by filtration through porous materials, such as filters of temperature-resistant steel or glass or of temperature-resistant ceramic, for example, referred to as ceramic foam filters, of the kind available commercially, for example, from the company CERANEX.

Also advantageous is the removal of the colored glass particles, preferably glass platelets, from the metal salt melt by the dissolution of the metal salt melt comprising the glass platelets in a liquid, with the subsequent removal of the glass platelets from the liquid by filtration.

The introduction of the colored glass particles, preferably colored glass platelets, and of the melt comprising metal salts into the liquid may take place before or after cooling of the melt.

Provision is also made for colored glass particles removed by means of porous materials to be introduced additionally into a solvent. In order to facilitate the introduction of the colored glass particles, the solvent may additionally be stirred and/or heated.

Solvents used are, advantageously, water, with particular advantage fully demineralized water, aqueous solutions of acids, such as nitric acid, sulfuric acid or hydrochloric acid, for example, or bases, such as sodium hydroxide solution, potassium hydroxide solution, ammonia or alcohols, for example, such as methanol, ethanol, and isopropanol, for example, acetone and ethyl acetate, and mixtures thereof.

Salt residues present on the colored glass particle surface are removed advantageously with solvent known to the skilled person (step (d)). Solvents employed are preferably the liquids already used in the optional step (c).

As and when needed, the surface-cleaned colored glass particles, preferably colored glass platelets, are dried at a temperature of 50° C. to 500° C. under atmospheric pressure or under a reduced pressure of 50 mbar to 800 mbar.

The coloredness (color intensity) of the colored glass particles thus provided, especially of the colored glass platelets, can be improved through a further heat treatment. For this purpose, the colored glass particles, preferably glass platelets, are heat-treated in a further optional step (e) with a temperature adapted to the softening temperature of the respective glass type, preferably at a temperature of 100° C. to 1000° C., more preferably at a temperature of 120° C. to 700° C. This heat treatment tailored to the particular colored glass particles, preferably colored glass platelets, takes place within a time frame of a few minutes up to two days, preferably of 10 minutes to 24 hours, more preferably of 20 minutes to 1.5 hours, preferably in a pressure range from 100 mbar to 10 bar.

It is optionally possible, as already illustrated above, for the heat treatment of the pigments to take place under inert conditions, as for example in an inert gas atmosphere comprising nitrogen ($N_2$) and/or argon (Ar). For the heat treatment of colored glass particles, preferably colored glass platelets, it is preferred to use reducing gas mixtures, such as those of nitrogen and hydrogen (forming gas), for example. Forming gas, as it is known, contains hydrogen at a concentration of 0.1% to 100% by volume, preferably 3% to 30% by volume, in nitrogen or argon, for example. Heat treatment of the colored glass particles, preferably glass platelets, under a reducing gas atmosphere produces preferably metallic nanoparticles, which lead to an intensive coloring of the glass particles, preferably the glass platelets.

It is also possible to carry out the optional heat treatment of the glass pigments under oxidizing conditions. This is done, for example, with oxygen or with an oxygen-containing gas mixture, containing 0.1% by volume to approximately 100% by volume, preferably 0.5% by volume to 30% by volume, of oxygen, in nitrogen or argon, for example. In this case, metal oxides are formed preferably in the colored glass particles, preferably glass platelets.

The colored glass particle of the invention, preferably colored planar glass platelet, is suitable for all of the applications known to the skilled person in which colored particles, pigments, dyes, colorants, etc., are used.

The colored glass particles, preferably colored planar glass platelets, are used preferably in the form, for example, of effect pigments, for the coloring of plastics, coatings, powder coatings, paints, printing inks, varnishes, ceramic and cosmetic articles, agricultural films, or food packaging.

The colored glass particles, more particularly colored planar glass platelets, in the form of effect pigments, for example, may also be used as jewelry, decorative articles, and fittings, or for enhancing jewelry, art objects, decorative articles, fittings, footwear or clothing. The colored glass particles may also be used as marking assistants in traffic markings, guiderails, street posts, road signs, etc.

The glass particles colored in accordance with the invention may be used with advantage more particularly as paste or flakes in the production of jewelry, including costume jewelry, and for the trimming of footwear and clothing.

In accordance with one very preferred embodiment, the colored glass particles, more particularly the colored glass platelets, are used for producing effect pigments. When the colored glass platelets are coated with metal oxides, preferably with low- and high-index metal oxides, intensely colored effect pigments are provided.

If colored spherical glass particles, preferably colored glass balls, are coated with metal oxides, preferably with low- and high-index metal oxides, it is possible to provide glass beads with an intensely colored shimmer. These glass beads may likewise be used with advantage in the production of jewelry, including costume jewelry, and for the trimming of footwear and clothing.

The examples which follow illustrate the invention, without restricting it.

General foundations of the experimental examples: Chemicals from VWR International GmbH (Darmstadt, Germany) were used. All chemicals were at least of p.a. (pro analysi) grade and were used without further purification. Water used was fully demineralized water. An oven used was a muffle furnace from Nabertherm GmbH (Lilienthal, Germany). Forming gas (5% hydrogen, 95% argon) was purchased from Linde AG (Munich, Germany). The glass platelets used were GF 100 M glass platelets having a particle size distribution with a $D_{10}=50$ μm, $D_{50}=95.8$ μm, and a $D_{90}=169.2$ μm, from Glassflake Ltd., Leeds (Great Britain). All percentages without further addition represent percentages by mass. For the scanning electron microscopy investigations (SEM) and also the SEM-EDX analyses (energy dispersive X-ray spectroscopy analysis), a Leo Supra 35 instrument from Zeiss was used.

EXAMPLES

Inventive Example 1

Step 1: Coloring of Glass Platelets to Produce Yellow Glass Pigments

Figure 1:
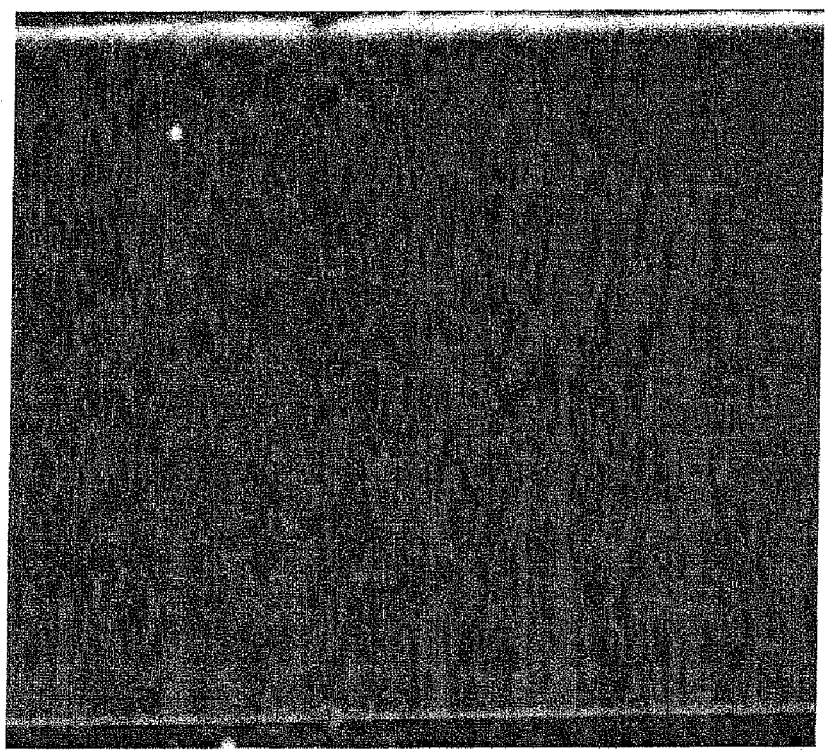
FIG. 1 shows a cross section through a glass platelet of the invention, colored with silver nitrate (inventive example 1).

Yellow glass pigments were produced by first finely grinding 100 g of a mixture of 10% silver nitrate ($AgNO_3$) and 90% sodium nitrate ($NaNO_3$) with a mortar. The metal salt mixture, introduced in a crucible, was melted in a muffle furnace at 350° C. for 120 minutes. Into the low-viscosity melt, 5 g of colorless GF 100 M glass platelets were incorporated by stirring, and this system was left in the muffle furnace at 350° C. for 30 minutes. The melt was subsequently introduced into a container containing 10 liters of fully demineralized water. The salt formed in the water from the solidified melt was dissolved fully in the water by stirring. The glass platelets filtered from the aqueous suspension were dried overnight at 50° C. The pale yellow colored glass platelets were subjected to analysis by scanning electron microscopy. No silver particles greater than 20 nm were found in the pigment. However, a number of approximately spherical silver deposits were found on the glass platelet surface. Cross sections produced from these glass platelets were investigated using a scanning electron microscope. The cross sections investigated likewise contained no particles greater than 20 nm (FIG. 1).

Figure 2:
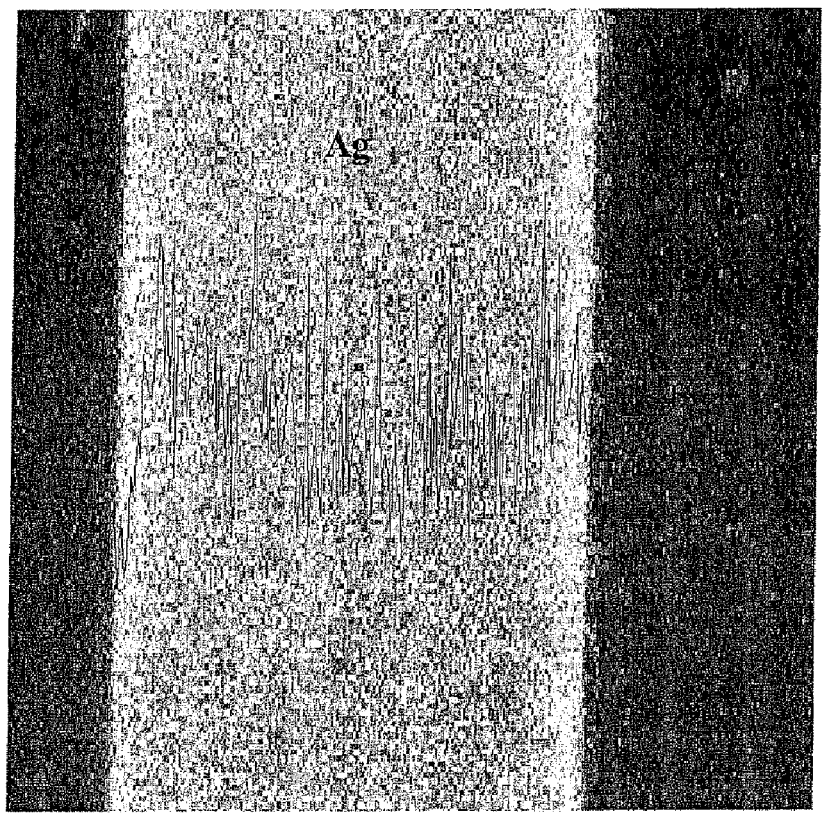
FIG. 2 shows the profile of the silver concentration over the cross section shown in FIG. 1 (inventive example 1).

Subsequently, by means of SEM-EDX analysis, the silver concentration in these pigments was investigated. For this purpose, the profile of the silver concentration along the thickness axis of the pigment was analyzed (FIG. 2).

The experimental results show that the silver concentration is approximately constant along the entire thickness axis. The silver concentration therefore has a concentration profile which, surprisingly, differs substantially from the concentration profile that characterizes a typical diffusion process, in which the concentration of the inwardly diffusing colorant decreases over the distance to the interfaces (glass platelet surfaces).

It was additionally found that there is virtually no longer any sodium present in these colored glass platelets or glass pigments. The uncolored glass platelets used as initial material for glass pigment production contained sodium at a concentration of 7.98 atom-percent. This means that, during the melting procedure, there was a replacement of sodium ions, diffused from the glass, by silver ions diffused into the glass from the metal salt melt.

The experimental results are evident from tab. 2 below:

TABLE 2

Comparison of element contents

| | Initial glass platelet material (GF100M) | | | Colored glass platelets after melt bath | |
|---|---|---|---|---|---|
| Elem. | Mass [%] | Atomic [%] | Elem. | Mass [%] | Atomic [%] |
| O | 45.015 | 59.44 | O | 29.68 | 54.665 |
| Na | 8.68 | 7.98 | Na | 0.21 | 0.265 |
| Mg | 1.615 | 1.405 | Mg | 1.31 | 1.595 |
| Al | 2.98 | 2.335 | Al | 2.295 | 2.51 |
| Si | 32.96 | 24.795 | Si | 25.485 | 26.8 |
| Ag | 0.155 | 0.03 | Ag | 32.92 | 9.02 |
| K | 1.66 | 0.895 | K | 1.36 | 1.03 |
| Ca | 4.15 | 2.185 | Ca | 3.54 | 2.605 |
| Ti | 0.23 | 0.1 | Ti | 0.255 | 0.16 |
| Fe | 0.14 | 0.055 | Fe | 0.185 | 0.1 |
| Cu | 0.25 | 0.08 | Cu | 0.43 | 0.2 |
| Zn | 2.17 | 0.7 | Zn | 2.34 | 1.055 |
| Total | 100.000 | 100.000 | Total | 100.000 | 100.000 |

Step 2: Temperature Treatment of the Colored Glass Platelets

In a subsequent step, the pale yellowish colored glass platelets, cleaned to remove salt residues and dried, were heat-treated in a flat dish in the muffle furnace at a temperature of 600° C. for about 120 minutes. The heat-treated glass platelets or glass pigments had an intense yellow color.

Figure 3:
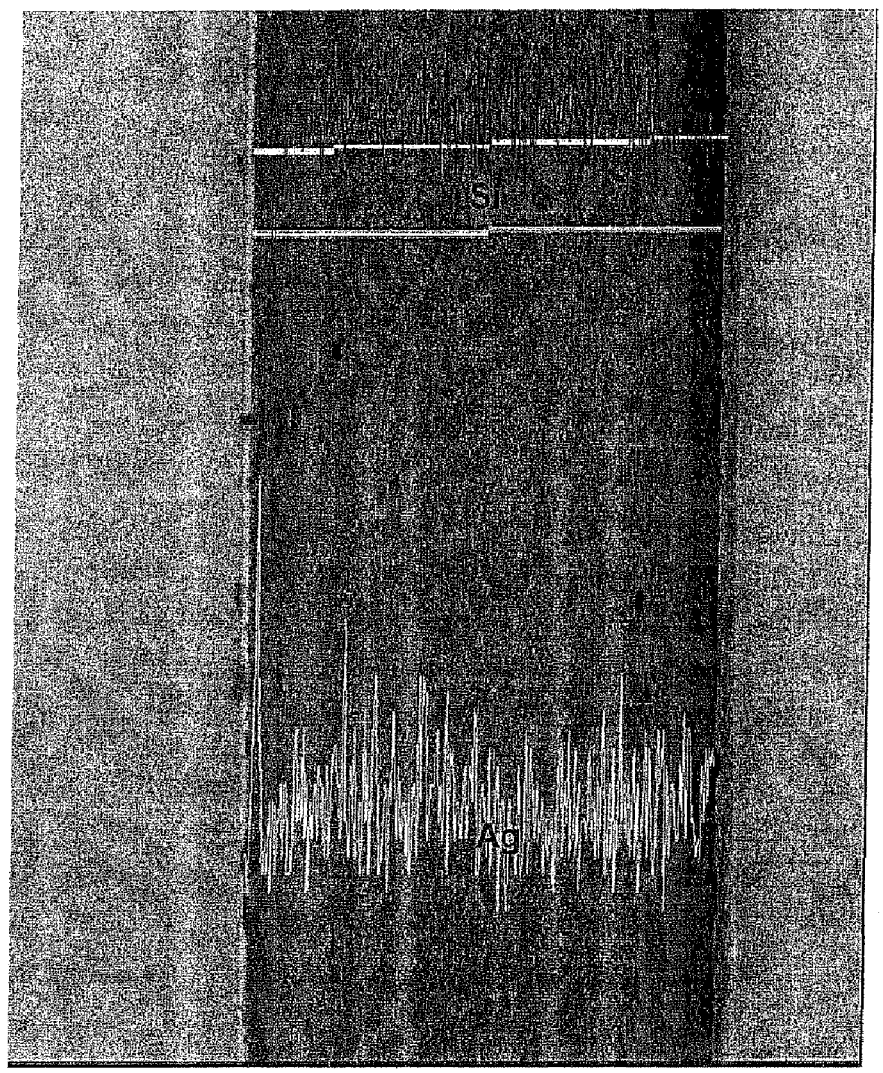
FIG. 3 shows the profile of the silver concentration over the cross section shown in FIG. 1, after heat treatment of the colored glass platelet (inventive example 1).

These glass pigments (intensely yellow colored glass platelets) were also analyzed by SEM and SEM-EDX. The analysis revealed that there were few silver particles present on the pigment surface. This result is also demonstrated by a sharp jump in the silver concentration directly at the pigment surface, as detected by means of SEM-EDX (FIG. 3). FIG. 3 shows that, as a result of the heat treatment of the glass pigments, silver from the pigment interior has reached the pigment surface. The profile of the silver concentration along the thickness axis in the glass pigment, however, is approximately constant. There is no evidence of any exponentially decreasing concentration profile in the direction of the interior of the glass platelet, as in the case of conventional diffusion processes.

In FIG. 3, furthermore, the silver nanoparticles incorporated in the colored glass platelet or in the glass pigment by temperature treatment are clearly apparent as black dots.

Figure 4:
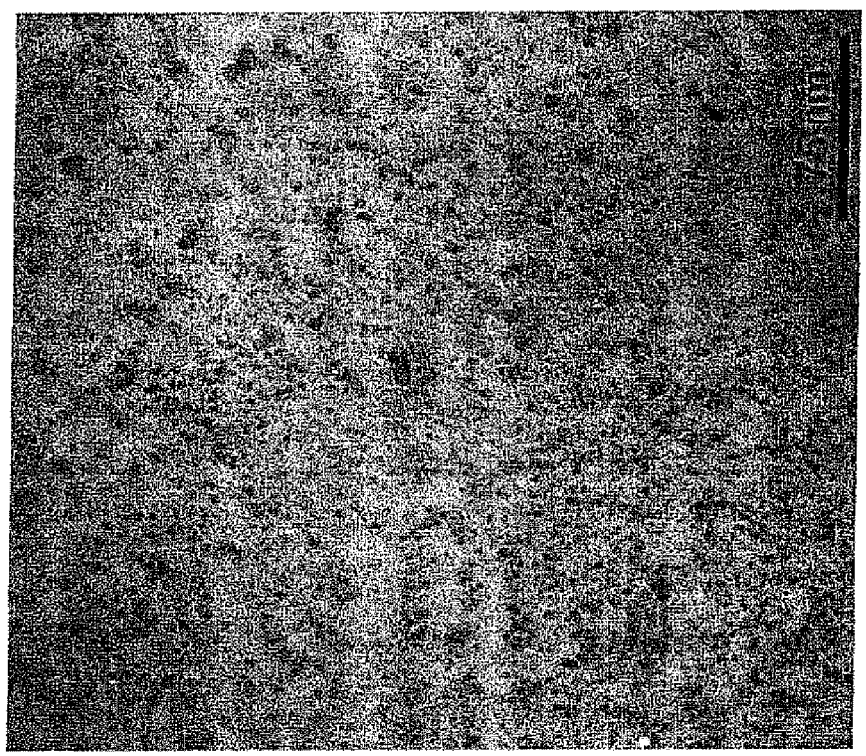
FIG. 4 shows a TEM micrograph of the glass platelet of the invention, colored with silver nitrate and heat treated (inventive example 1).

In addition, the glass platelets colored with silver, or the glass pigments obtained, were analyzed by means of TEM (transmission electron microscopy) (CM 70, Phillips). For this purpose, the pigment sample was thinned out over the area by ion bombardment (Ar), this being done on an Mo ring (plane view), single-sidedly and close to the surface. Silver particles were detectable in the glass (FIG. 4). The determination of the material took place by means of energy-dispersive spectroscopy X-ray (EDS) in the instrument.

Comparative Example 1

Colorless GF 100 M glass platelets were weighed out into a 250 ml glass beaker, to give a 15% by weight aqueous suspension. This suspension was stirred at room temperature, using a magnetic stirrer. Then 0.5 g of $AgNO_3$ were dissolved with 20 ml of FD water (FD: fully demineralized), with stirring by means of the magnetic stirrer, after which $NH_3$ was added until the precipitate formed on the first drop of $NH_3$ dissolved again. Then 0.9 g of KOH was dissolved in 10 ml of FD water and added to the $AgNO_3$ solution. The precipitate formed was again dissolved with $NH_3$. The solution was introduced into the suspension comprising glass platelets. Additionally, 125 mg of glucose in solution in 20 g of FD water were metered into the suspension for about 30 minutes, and the suspension was stirred for about 5 minutes. Thereafter the suspension was heated to a temperature of 40° C. until it was black in color. After that, the glass platelets were filtered from the suspension and washed with water. The glass platelets obtained had a gray-brown color. By addition of 10% strength $HNO_3$, the coloration was removed again.

Figure 5:
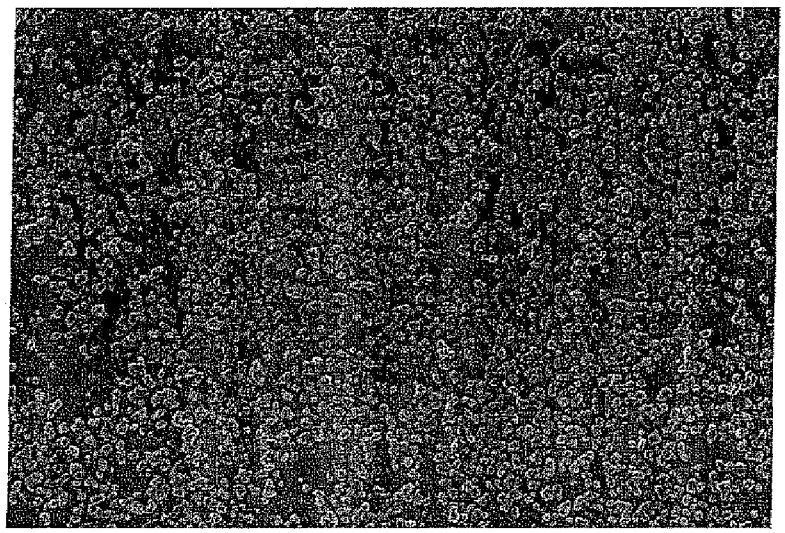
FIG. 5 shows an SEM micrograph of a glass platelet colored superficially for comparative purposes (comparative example 1).

The SEM micrograph (FIG. 5) prepared before the addition of 10% strength $HNO_3$ shows a multiplicity of silver particles deposited on the surface. No silver was detected in the interior of the pigment. This result confirms that particles accumulated only on the pigment surface do not result in permanent glass coloration.

INVENTIVE EXAMPLE 2

Green glass pigments were produced by first melting 100 g of a mixture of copper sulfate ($CuSO_4$) and sodium sulfate ($Na_2SO_4$) in a molar ratio of 55/45 mol % in a crucible in a muffle furnace at a temperature of 580° C. for about 180 minutes. Into the blue melt, 1 g of colorless GF 100 M glass platelets were incorporated by stirring, and the suspension was heat-treated at a temperature of 580° C. for about 5 minutes. The heat-treated melt was introduced into a vessel containing 10 liters of fully demineralized water. The salt formed from the melt solidified in the water was dissolved completely in the water with stirring. The treated/colored glass platelets were then filtered from the suspension and subsequently dried at a temperature of 50° C. Virtually colorless glass platelets were obtained.

Subsequently, a portion (variant 1) of these virtually colorless glass platelets, cleaned to remove salt residues and dried, were heat-treated in a flat dish in the muffle furnace at a temperature of 600° C. for about 60 minutes. The heat-treated glass platelets and glass pigments obtained had an intense green color. The red glass pigments thus obtained (variant 1) were subjected to SEM and SEM-EDX analysis. The element contents found are reported in tab. 3.

A further portion (variant 2) of these virtually colorless glass platelets, cleaned to remove salt residues and dried, were heat-treated in the muffle furnace at a temperature of 600° C. for about 60 minutes. However, before and during the heat treatment, the muffle furnace was flushed with forming gas (5% hydrogen in nitrogen). Following this heat treatment, intensively red glass platelets and glass pigments were obtained.

The red glass pigments thus obtained (variant 2) were subjected to SEM and SEM-EDX analysis. The analytical result, shown in tab. 3 below, shows that the sodium present in the glass platelets used as initial material for pigment production has been replaced by copper from the metal salt mixture: the corresponding element contents of the initial GF 100 M glass are set out in tab. 2.

TABLE 3

Element contents of the $CuSO_4$ treated glass platelets according to variants 1 and 2

| | Variant 1 | | | Variant 2 | |
| --- | --- | --- | --- | --- | --- |
| Elem. | Mass [%] | Atomic [%] | Elem. | Mass [%] | Atomic [%] |
| O | 50.035 | 66.33 | O | 38.27 | 55.92 |
| Na | 0.195 | 0.18 | Na | 0.23 | 0.235 |
| Mg | 1.865 | 1.63 | Mg | 1.575 | 1.515 |
| Al | 2.93 | 2.31 | Al | 2.815 | 2.435 |
| Si | 28.745 | 21.79 | Si | 33.115 | 27.56 |
| Ag | 0.085 | 0.015 | Ag | 0 | 0 |
| K | 7.975 | 4.37 | K | 10.56 | 6.325 |
| Ca | 3.21 | 1.71 | Ca | 4.82 | 2.815 |
| Ti | 0.195 | 0.09 | Ti | 0.3 | 0.145 |
| Fe | 0.13 | 0.05 | Fe | 0.125 | 0.05 |
| Cu | 2.885 | 0.955 | Cu | 5.125 | 1.89 |
| Zn | 1.75 | 0.575 | Zn | 3.065 | 1.1 |
| Total | 100 | 100 | Total | 100 | 100 |

Copper particles were likewise detected on the surface of these colored glass pigments.

Figure 6:
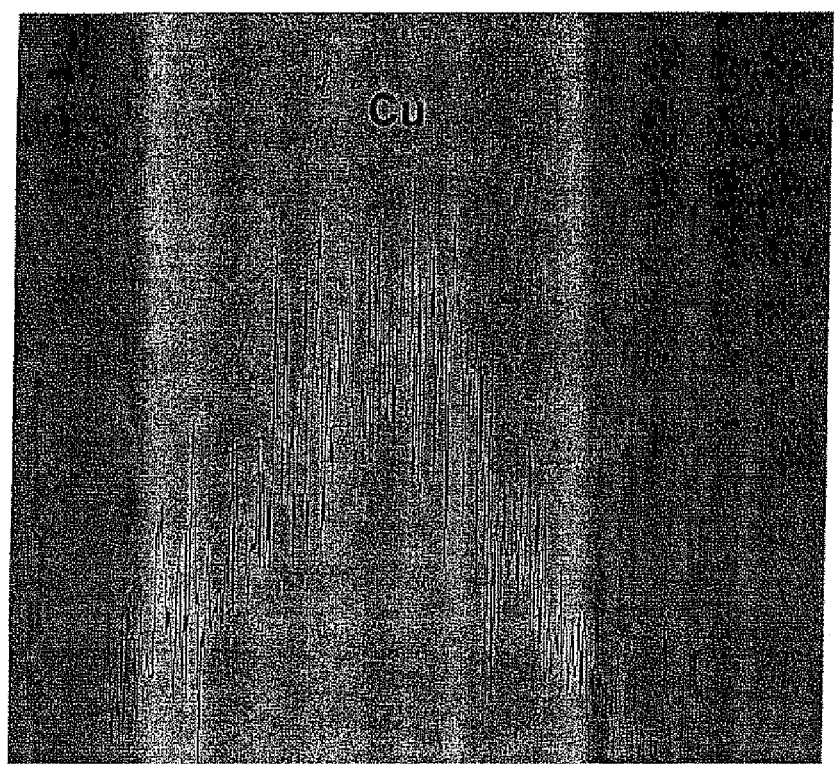
FIG. 6 shows the profile of the copper concentration in a glass platelet of the invention, treated with copper sulfate (inventive example 2, variant 2).
Figure 7:
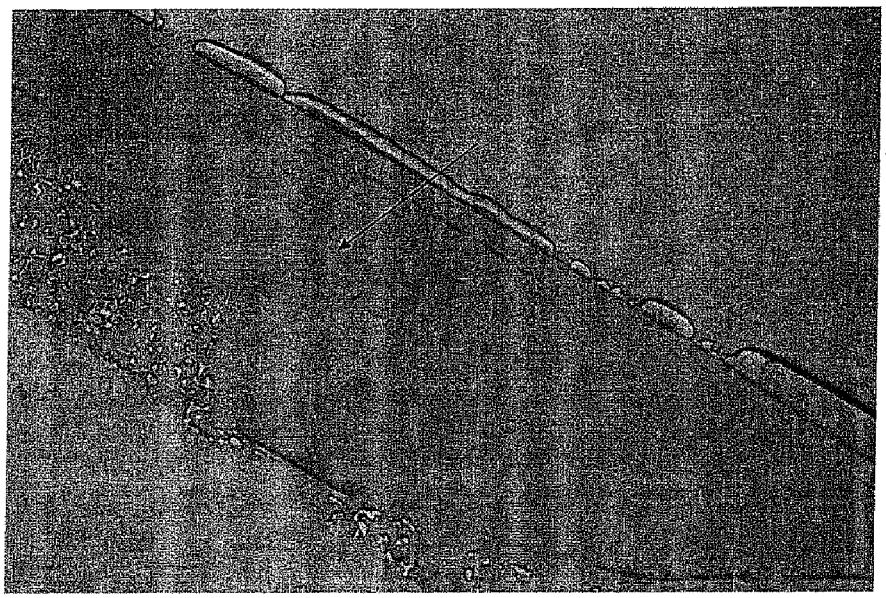
FIG. 7 shows a TEM micrograph of the glass platelet of the invention, colored with copper sulfate and heat treated (inventive example 2, variant 2).

FIG. 6 shows the profile of the copper concentration, measured by means of SEM, along the thickness axis of the colored glass platelets obtained in accordance with variant 2. The concentration in the glass pigment is relatively constant. There is no resulting concentration profile of the kind usual with diffusion processes. Instead, a profile is formed with a concentration which is highest in the pigment core. This increased copper concentration is confirmed by the high number of copper particles in the core of the colored glass platelet, which are visible in an SEM micrograph (FIG. 7).

In accordance with a further variant, red glass platelets or glass pigments were produced, in the manner described above, but the contact time was 40 minutes at a temperature of 580° C. (variant 3). A portion of the glass platelets or glass pigments, cleaned to remove salt residues and dried, were subsequently heat-treated in a flat dish in the muffle furnace at a temperature of 600° C. for 90 minutes. Before and during the heat treatment, the muffle furnace was flushed with forming gas (5% hydrogen in nitrogen). Following this heat treatment, the glass pigments had an intense red color. These pigments were also subjected to SEM and SEM-EDX analysis.

The outcome of the analysis was that copper particles were present on the pigment surface.

Figure 8:
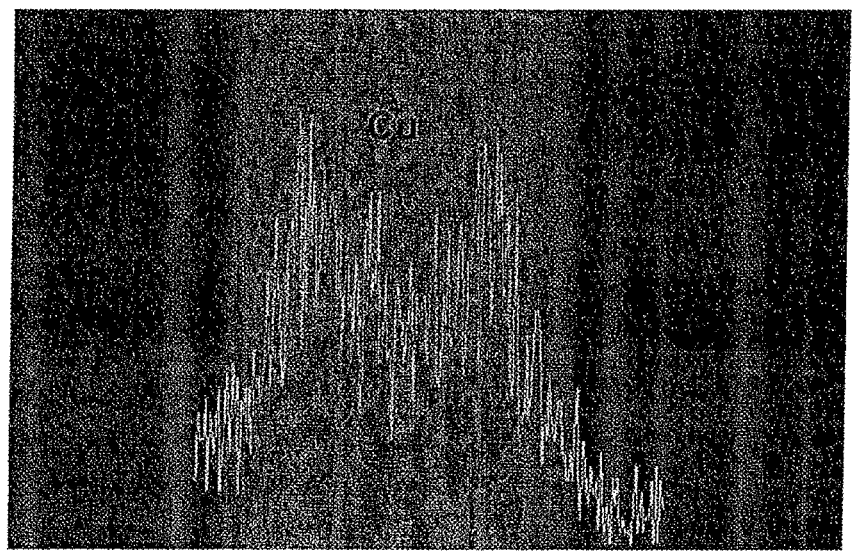
FIG. 8 shows the profile of the copper concentration in a glass platelet of the invention, treated with copper sulfate (inventive example 2, variant 2).

FIG. 8 shows that the profile of the copper concentration along the thickness axis in the glass platelet glass pigment is relatively constant and drops off in each case in the marginal region. The concentration profile usual with conventional diffusion processes, where the colorant drops off in the direction of the center of the article to be colored, was not formed.

Figure 9:
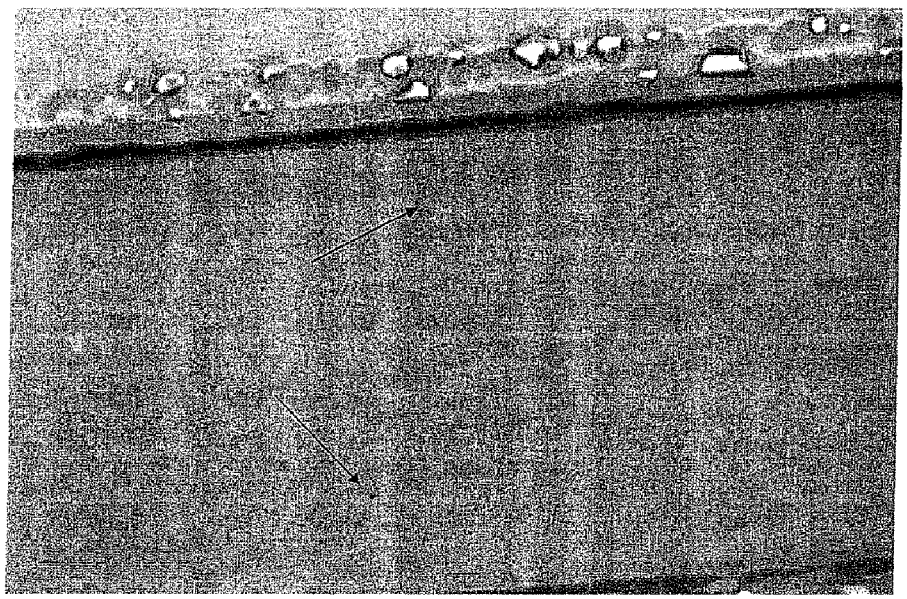
FIG. 9 shows a TEM micrograph of the glass platelet of the invention, colored with copper sulfate and heat treated (inventive example 2, variant 2).

Instead, the concentration profile has two peaks in the glass platelet or pigment core. This increased copper concentration in the two regions is confirmed by the multiplicity of visible copper particles in the respective pigment zones by means of SEM micrograph (FIG. 9).

INVENTIVE EXAMPLE 3

Blue glass pigments were produced by first melting 100 g of a mixture of 50% cobalt sulfate ($CoSO_4$) and 50% sodium chloride (NaCl) in a crucible in a muffle furnace at 500° C. for about 180 minutes. Into the blue melt, 1 g of colorless GF 100 M glass platelets were incorporated, and the system was left in the muffle furnace at 500° C. for 60 minutes. The melt was then introduced into a container containing 10 liters of fully demineralized water. The salt formed from the melt solidified in the water was dissolved fully in the water with stirring. The colored glass platelet or glass pigment was subsequently filtered from the suspension and thereafter dried at a temperature of 50° C. Glass platelets or glass pigments with a pale blue coloration were obtained.

Subsequently, a portion of the bluish glass platelets or pigments, cleaned to remove salt residues and dried, were heat-treated in a flat dish in the muffle furnace at 580° C. for 60 minutes. Intense blue glass platelets or glass pigments were obtained.

INVENTIVE EXAMPLE 4

Red glass pigments were produced by first melting 100 g of a mixture of 5% tetrachloroauric acid ($HAuCl_4$ and 95% sodium nitrate ($NaNO_3$) in a crucible in a muffle furnace at 350° C. for 180 minutes. Subsequently, into the salt melt, 1 g of colorless GF 100 M glass platelets were incorporated, and the system was left at 350° C. for minutes. Thereafter the melt comprising glass platelets was introduced into a container containing 10 liters of fully demineralized water. The salt formed from the melt solidified in the water was dissolved fully in the water with stirring. The glass platelets were subsequently filtered from the aqueous suspension, and the separated glass platelets were dried at 50° C. Virtually colorless glass platelets were obtained. A portion of these glass platelets, cleaned to remove salt residues and dried, was heat-treated in a flat dish in the muffle furnace at 700° C. for 30 minutes. The heat-treated glass platelets or glass pigments had an intense red color.

INVENTIVE EXAMPLE 5

Green glass pigments were produced by first melting 100 g of a mixture of 50% sodium chromate ($Na_2Cr_2O_7$) and sodium nitrate ($NaNO_3$) in a crucible in a muffle furnace at 320° C. for 180 minutes. Into the salt melt, 1 g of colorless GF 100 M glass platelets were incorporated by stirring, and the system was then left in the muffle furnace at 320° C. for 80 minutes. Subsequently the melt comprising glass platelets was introduced into a container containing 10 liters of fully demineralized water. The salt formed from the melt solidified in the water was dissolved fully in the water with stirring. Thereafter the glass platelets were filtered from the aqueous suspension and the separated glass platelets were dried at 50° C. Virtually colorless glass platelets were obtained. In a further step, a portion of these glass platelets, cleaned to remove salt residues and dried, were heat-treated in a flat dish in the muffle furnace at 600° C. for 60 minutes. Glass platelets or pigments with an intense green color were obtained.

INVENTIVE EXAMPLE 6

Green glass pigments were produced by first melting 100 g of a mixture of 80% iron chloride ($FeCl_3$), 11% lithium chloride (LiCl), and 9% potassium chloride (KCl) in a crucible in a muffle furnace at 180° C. for 180 minutes. Into the salt melt, 1 g of colorless GF 100 M glass platelets were incorporated by means of stirring, and the system was left at 180° C. for 60 minutes. The melt was subsequently introduced into a container containing 10 liters of fully demineralized water. The salt formed from the melt solidified in the water was dissolved fully in the water with stirring. The glass platelets filtered from the aqueous suspension were dried at 50° C. Virtually colorless glass platelets were obtained. Subsequently, a portion of these glass platelets, cleaned to remove salt residues and dried, were heat-treated in a flat dish in the muffle furnace at a temperature of 600° C. for about 1 hour. The glass platelets or pigments obtained had an intense blue-green color.

INVENTIVE EXAMPLE 7

Cu-Colored Glass Platelets with $TiO_2$ Coating

For the coating of glass platelets colored with doped copper, from inventive example 2, after treatment with forming gas (variant 2), with $TiO_2$, 50 g of GF 100 M glass platelets were suspended in 280 ml of distilled water and the suspension was heated to 80° C. with turbulent stirring. The pH was then adjusted to 1.9 using dilute hydrochloric acid, and 10 ml of an $SnCl_4$ solution (24 g Sn/l) were added dropwise to the suspension over 1 hour. During this addition, the pH was kept constant at 1.9 by counter-addition with 10% NaOH. This was followed by stirring for 15 minutes more, for the purpose of complete deposition. The pH of the suspension was subsequently lowered to 1.6 using dilute HCl, and a $TiCl_4$ solution (200 g $TiO_2$/l) was added dropwise to the suspension at 0.07 ml/min. During this addition, the pH was kept constant at 1.6 by counter-control with 10% NaOH. Where different interference colors are present, small interim samples were taken. As soon as the coated glass platelet had a greenish interference color, the experiment was ended, the final sample was isolated by filtration, and this sample was rinsed with FD water. All samples were calcined at 650° C. for 30 minutes. Strongly colored interference pigments with a red absorption color were obtained.

INVENTIVE EXAMPLE 8

Ag-Colored Glass Platelets with $TiO_2$ Coating

For the coating of glass platelets colored with doped silver, from inventive example 1 with $TiO_2$, 50 g of the GF 100 M glass platelets were suspended in 280 ml of distilled water and the suspension was heated to 80° C. with turbulent stirring. The pH was then adjusted to 1.9 using dilute hydrochloric acid, and 10 ml of an $SnCl_4$ solution (24 g Sn/l) were added dropwise to the suspension over 1 hour. During this addition, the pH was kept constant at 1.9 by counter-addition with 10% NaOH. This was followed by stirring for 15 minutes more, for the purpose of complete deposition. The pH of the suspension was subsequently lowered to 1.6 using dilute HCl, and a $TiCl_4$ solution (200 g $TiO_2$/l) was added dropwise to the suspension at 0.07 ml/min. During this addition, the pH was kept constant at 1.6 by counter-control with 10% NaOH. Where different interference colors are present, small interim samples were taken. As soon as the coated glass platelet had a greenish interference color, the experiment was ended, the final sample was isolated by filtration, and this sample was rinsed with FD water. All samples were calcined at 650° C. for 30 minutes.

Strongly colored interference pigments with a yellow absorption color were obtained.

INVENTIVE EXAMPLE 9

Inventive examples 1 to 8 were repeated with the modification below.

The removal of the GF 100 M glass platelets from the melt, following production in accordance with one of the inventive examples specified above, was not carried out by dissolving the melt in water. Instead, a melt was generated first of all. Subsequently, a quartz-glass filter crucible with a porous base with a porosity of 0 (QSil AG Quarzschmelze Ilmenau, Ilmenau), was partly immersed into the glass melt, so that the crucible was ⅔ full of melt. The uncolored GF 100 M glass platelets were subsequently introduced with stirring into the melt within the filter crucible. After the time necessary for diffusion, the crucible was slowly drawn upward out of the melt, with a large part of the melt falling downward through the porous base. The crucible with the glass platelets and the residues of melt were subsequently cooled in the ambient air. The glass platelets were subsequently dissolved from the crucible using water, with the small residues of salt going into solution at the same time. The subsequent procedure was as described in the examples. By means of this technique, the amount of salt occurring subsequently in the liquid was reduced significantly, i.e., to less than 10% by weight, in comparison to the previous examples.

Comparative Example 2

Example 3 in accordance with WO 2008/125857 was repeated, as comparative example 2, with the modification that, instead of the colorless GF 300 M glass platelets from Glassflake Ltd., England, the colorless GF 100 M glass platelets from Glassflake Ltd., England, were used.

The red glass platelets thus obtained (variant 1) were subjected to SEM and SEM-EDX analysis. The elemental contents determined are listed in tab. 4 under variant 1. The elemental contents in the initial GF 100 M glass are recorded in tab. 2 (left-hand column).

A further portion (variant 2) of the resultant glass platelets were heat-treated in a muffle furnace at a temperature of 600° C. for about 60 minutes. Before and during the heat treatment, the muffle furnace was flushed with forming gas (5% hydrogen in nitrogen). Following this heat treatment, the resultant red glass platelets were subjected to SEM and SEM-EDX analysis. The elemental contents determined are set out in tab. 4 under variant 2. The element contents of the initial GF 100 M glass are reported in tab. 2 (left-hand column).

TABLE 4

| | Variant 1 | | | Variant 2 | |
|---|---|---|---|---|---|
| Elem. | Mass % | Atomic % | Elem. | Mass % | Atomic % |
| O | 40.44 | 57.25 | O | 42.64 | 58.93 |
| Na | 2.71 | 2.67 | Na | 2.69 | 2.58 |
| Mg | 0.88 | 0.82 | Mg | 0.76 | 0.69 |
| Al | 2.85 | 2.39 | Al | 2.64 | 2.17 |
| Si | 37.41 | 30.17 | Si | 38.86 | 30.59 |
| Ag | 0.20 | 0.04 | Ag | 0.34 | 0.07 |
| K | 1.18 | 0.68 | K | 1.01 | 0.57 |
| Ca | 3.92 | 2.21 | Ca | 2.17 | 1.20 |
| Ti | 0.52 | 0.25 | Ti | 0.85 | 0.39 |
| Fe | 0.14 | 0.05 | Fe | 0.13 | 0.05 |

TABLE 4-continued

| | Variant 1 | | | Variant 2 | |
|---|---|---|---|---|---|
| Elem. | Mass % | Atomic % | Elem. | Mass % | Atomic % |
| Cu | 7.91 | 2.82 | Cu | 7.59 | 2.64 |
| Zn | 1.85 | 0.64 | Zn | 0.32 | 0.11 |
| Total | 100.00 | 100.00 | Total | 100.00 | 100.00 |

Figure 10A:
FIG. 10a shows an SEM micrograph of colored glass platelets (variant 1) in accordance with comparative example 2 (example 3 of WO 2008/125857).

FIG. 10a shows SEM micrographs of the colored glass platelets according to variant 1 of comparative example 2. The resultant colored glass platelets have deformations and are therefore not planar. At the regions marked with arrows, the deformations are visible in the form of edges and angles which are "impressions" of underlying glass pigments.

Figure 10B:
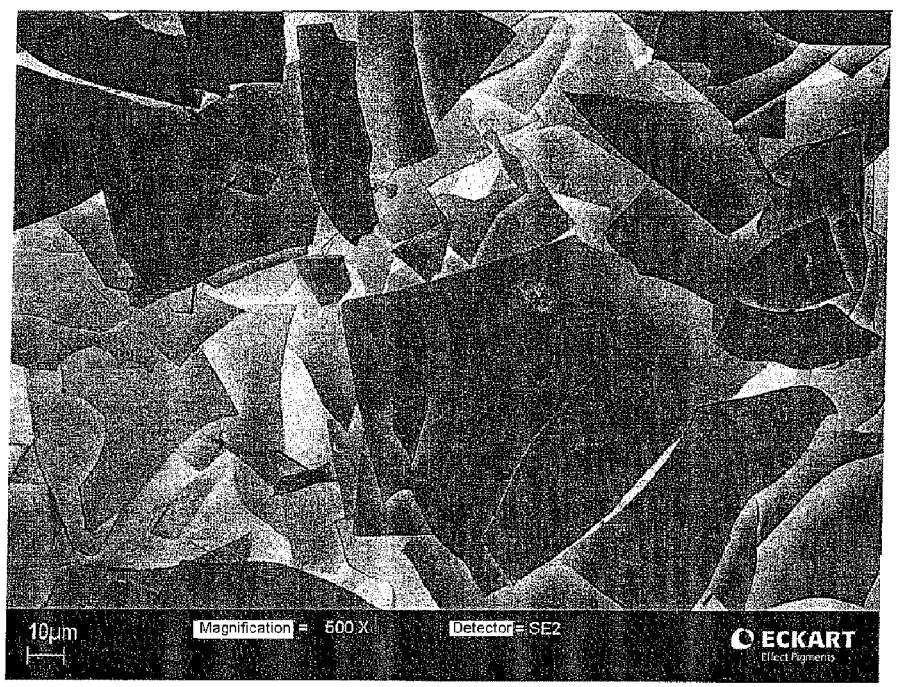
FIG. 10b shows an SEM micrograph of colored glass platelets of the invention, in accordance with inventive example 2 (variant 1).

FIG. 10b shows SEM micrographs of the colored glass platelets of the invention, in accordance with variant 1 of inventive example 2. The resultant colored glass platelets do not have any deformations and are therefore planar.

Figure 11:
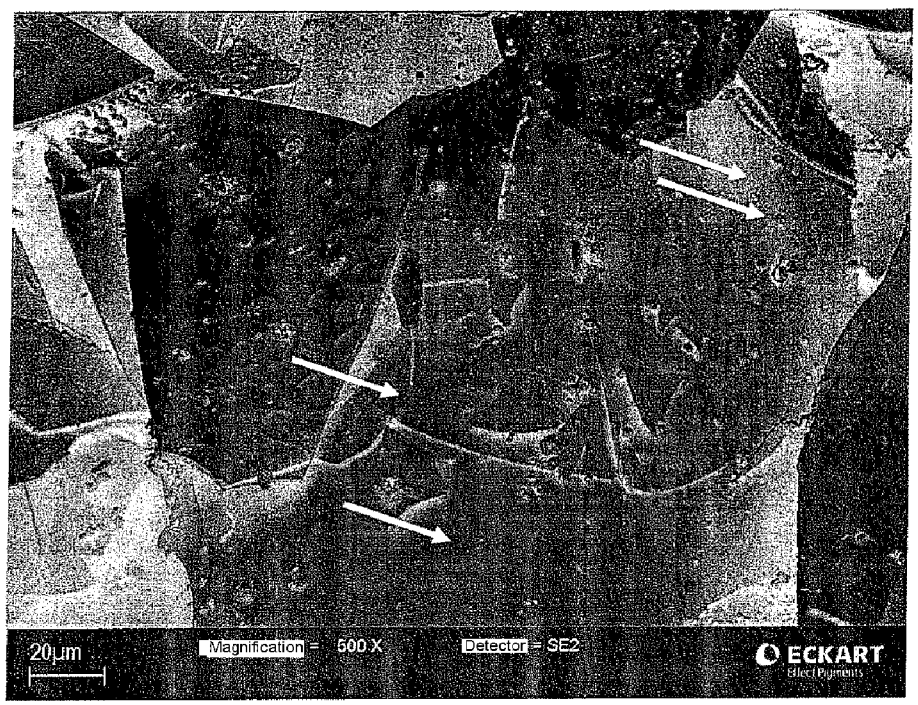
FIG. 11a shows an SEM micrograph of colored glass platelets in accordance with comparative example 2 (example 3 of WO 2008/125857) after treatment with forming gas (5% hydrogen in nitrogen) (variant 2).
FIG. 11b shows an SEM micrograph of colored glass platelets of the invention, in accordance with inventive example 2 (variant 2).

FIG. 11a shows SEM micrographs of the colored glass platelets according to variant 2 of comparative example 2. The resultant colored glass platelets have deformations and are therefore not planar. At the regions marked with arrows, the deformations are visible in the form of edges and angles which are "impressions" of underlying glass pigments. It is apparent, furthermore, that, following the reduction with forming gas, the glass platelets have craters or depressions, which likewise severely lessen the quality of the glass platelets obtained.

Figure 11B:

FIG. 11b shows SEM micrographs of the colored glass platelets of the invention, in accordance with variant 1 of inventive example 2. The resultant colored glass platelets do not have any deformations and are therefore planar.

Comparative Example 3

Example 5 in accordance with WO 2008/125857 was repeated, as comparative example 3, with the modification that, instead of the colorless GF 300 M glass platelets from Glassflake Ltd., England, the colorless GF 100 M glass platelets from Glassflake Ltd., England, were used.

The yellow glass platelets thus obtained were subjected to SEM and SEM-EDX analysis. The elemental contents determined are listed in tab. 5. The elemental contents in the initial GF 100 M glass are recorded in tab. 2 (left-hand column).

TABLE 5

| Elem. | Mass % | Atomic % |
|---|---|---|
| O | 46.36 | 61.65 |
| Na | 8.49 | 7.86 |
| Mg | 1.12 | 0.98 |
| Al | 2.53 | 2.00 |
| Si | 31.43 | 23.81 |
| Ag | 4.01 | 0.79 |
| K | 1.51 | 0.82 |
| Ca | 2.83 | 1.50 |
| Ti | 0.35 | 0.16 |
| Fe | 0.00 | 0.00 |
| Cu | 0.13 | 0.04 |
| Zn | 1.24 | 0.40 |
| Total | 100.00 | 100.00 |

Figure 12A:
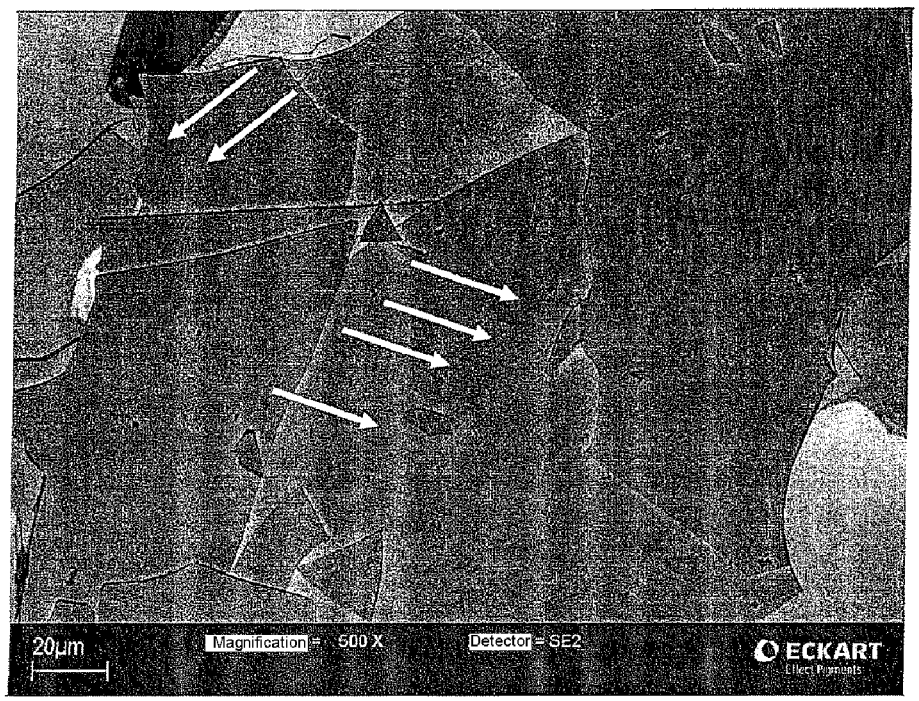
FIG. 12a shows an SEM micrograph of colored glass platelets, in accordance with comparative example 3 (example 5 of WO 2008/125857).

FIG. 12a shows SEM micrographs of the colored glass platelets of comparative example 3. The resultant colored glass platelets have deformations and are therefore not planar. At the regions marked with arrows, the deformations are visible in the form of edges and angles which are "impressions" of underlying glass pigments.

Figure 12B:
FIG. 12b shows an SEM micrograph of colored glass platelets of the invention, in accordance with inventive example 1.

FIG. 12b shows SEM micrographs of the colored glass platelets of the invention, of inventive example 1. The resultant colored glass platelets do not have any deformations and are therefore planar.

INVENTIVE EXAMPLE 10

Eyeshadow

A red eyeshadow was produced by processing the ingredients indicated in table 6, as follows: first of all, all of the ingredients specified under A were mixed and were mixed for 30 seconds using a high-speed mixing assembly at 2500 rpm. Then components B were added, followed by mixing for 60 seconds with a high-speed mixing assembly at 3000 rpm. Lastly, the mixture was pressed at 150 bar for 30 seconds.

TABLE 6

| INCI name | Product name | Mass fraction [%] | Supplier |
|---|---|---|---|
| Phase A | | 100.00 | |
| Mica | Silk Mica | 17.00 | www.vwr.com |
| Boron Nitride | Softouch CCS 102 | 2.50 | www.advceramicscos.com |
| Zinc Stearate | Kemilub EZ-V | 7.00 | www.undesa.com |
| Talc | Talc Powder | ad 100 | www.riedeldehaen.com |
| Glass platelets colored using copper, with a red absorption color and a TiO$_2$ coating | According to example 7 | 5.00-40.00 | www.eckart.net |
| Phase B | | | |
| Dimethicone | Dow Corning ® 200 Fluid 5 cst | 5.00 | www.dowcorning.com |
| Cyclomethicone (and) Dimethicone Crosspolymer | Dow Corning ® 9040 Elastomer | 5.00 | www.dowcorning.com |

INVENTIVE EXAMPLE 11

Lip Gloss

A red lip gloss was produced by processing the ingredients indicated in table 7 below as follows: first of all, of the components under A (table 7) were mixed with one another. The mixture was then heated to 85° C. With stirring, component B (table 7) was added and the composition was homogenized.

TABLE 7

| INCI name | Product name | Mass fraction [%] | Supplier |
|---|---|---|---|
| Phase A | | 100.00 | |
| Hydrogenated polyisobutene (and) ethylene/propylene/-styrene copolymer (and) butylene/ethylene/styrene | Versagel ME 750 | ad 100 | www.penreco.com |

TABLE 7-continued

| INCI name | Product name | Mass fraction [%] | Supplier |
|---|---|---|---|
| copolymer | | | |
| *Simmondsia Chinensis* (jojoba) seed oil | Jojoba oil - natural/ golden | 2.00 | www.biochemica.com |
| Caprylyl trimethicone | Silcare Silicone 31M50 | 7.00 | www.clariant.com |
| Stearyl dimethicone | Silcare Silicone 41M65 | 3.20 | www.clariant.com |
| Hydrogenated polydecene | Nexbase 2002 | 4.00 | www.jandekker.com |
| Isopropyl myristate | isopropyl myristate | 4.50 | www.vwr.com |
| Phase B | | | |
| Glass platelets colored using copper, with a red absorption color and a TiO₂ coating | according to example 7 | 15.00 | www.eckart.net |

INVENTIVE EXAMPLE 12

Body Lotion

A red body lotion was produced by processing the ingredients indicated in table 8 below, as follows: first of all, the components A were mixed and then the components B were added with stirring. The mixture was heated to 80° C. with stirring. In the intervening period, all of components C were mixed and heated to 80° C. with stirring. Then mixture C was added to the mixture from A and B with shaking. The mixture of A, B, and C was cooled to 50° C. and then the components D were added. This mixture was stirred for a while at 40° C. to 50° C. Lastly, the mixture was cooled to room temperature.

TABLE 8

| INCI name | Product name | Mass fraction [%] | Supplier |
|---|---|---|---|
| Phase A | | 100.00 | |
| Water | | ad 100 | |
| Carbomer | Acritamer 934 | 0.50 | www.ritacorp.com |
| Phase B | | | |
| Propylene glycol | 1,2-propanediol | 2.75 | www.vwr.com |
| Glycerin | Pricerine 9090 | 0.50 | www.uniqema.com |
| Phase C | | | |
| Glass platelets colored using copper, with a red absorption color and a TiO₂ coating | according to example 7 | 15.00 | www.eckart.net |
| Isopropyl palmitate | Rita IPP NF | 2.00 | www.ritacorp.com |
| Glyceryl stearate | Imwitor 960 K | 2.00 | www.sasolwax.com |
| Stearic acid | Kortacid 1895 | 2.00 | www.akzonobel.com |
| *Butyrospermum Parkii* butter (shea butter) | Shea butter | 2.00 | www.jandekker.com |
| Cetyl alcohol | Cetyl alcohol | 1.00 | www.vwr.com |
| Cyclomethicone | Dow Corning 345 Fluid | 0.20 | www.dowcorning.com |
| Dimethicone | Dow Corning 200 Fluid/350 cst | 0.20 | www.dowcorning.com |
| Isostearyl lactate | Patlac IL | 2.00 | www.ritacorp.com |
| Methylparaben, propylparaben | Rokonsal SSH-1 | 0.30 | www.biochema.com |
| Tocopheryl acetate | DL-alpha-tocopherolacetate | 0.10 | www.roche.com |
| Phase D | | | |
| Triethanolamine | Triethanolamine | 0.75 | www.vwr.com |
| Panthenol | D-panthenol 75L | 0.50 | www.basf.om |
| Fragrance | Palma Energy DF05 | q.s. | www.bell-europe.com |

INVENTIVE EXAMPLE 13

Eyeshadow Cream

A red eyeshadow cream was produced by processing the ingredients indicated in table 9, as follows: first of all, the components A were mixed and heated at 85° C. Then, with stirring, the components B (strong-colored interference pigments with a red absorption color) were added and were mixed thoroughly at 85° C. until a homogeneous appearance was obtained. The composition was then dispensed hot into the packaging.

TABLE 9

| INCI name | Product name | Mass fraction [%] | Supplier |
|---|---|---|---|
| Phase A | | 100.00 | |
| Castor oil | Castor oil | ad 100 | www.riedeldehaen.com |
| Octyl palmitate | Liponate EHP | 6.00 | www.lipochemicals.com |
| Coconut oil | Lipovol C-76 | 7.00 | www.lipochemicals.com |
| Bees Wax | Ewacera 12 | 8.00 | www.wagnerlanolin.com |
| Isopropyl lanolate | Isopropyl lanolate | 5.00 | www.wagnerlanolin.com |
| *Prunus Armeniaca* (apricot) kernel oil and hydrogenated apricot kernel oil | Apricot butter | 7.00 | www.impag.de |
| Magnesium stearate | Magnesium stearate | 5.00 | www.sigmaaldrich.com |
| Bis-Hydroxyethoxy-propyl dimethicone | Dow Corning 5562 Carbinol Fluid | 5.00 | www.dowcorning.com |
| Phenoxyethanol (and) methylparaben (and) ethylparaben (and) butylparaben | Uniphen-23 | 0.30 | www.permcos.com |
| Phase B | | | |
| Strongly colored interference pigments with red absorption color | according to example 7 | 22.00 | www.eckart.net |

What is claimed is:

1. Glass particles colored with at least one colorant, wherein the colored glass particles are glass platelets with an average diameter of 1 to 500 μm and the at least one colorant comprises at least one of metallic nanoparticles and metal oxides, wherein the glass platelets are planar and the colorants are present in a concentration from 1% to 55% by weight, based on the total weight of the colored glass platelets.

2. The colored glass particles of claim 1, wherein the concentration profile of colorant in the colored glass platelet over the thickness of the colored glass platelet is less than 10% by weight, in the interior of the glass platelet relative to a marginal region of the glass platelet.

3. The colored glass particles of claim 1, wherein the colored glass platelets have a colorant content from 1.5% to 40% by weight, based on the total weight of the colored glass platelets.

4. The colored glass particles of claim 1, wherein the metallic nanoparticles are selected from the group consisting of gold, silver, copper, iron, chromium, cobalt, nickel, platinum, alloys of these metals, mixtures of these metals, and core-shell particles of these metals.

5. The colored glass particles of claim 1, wherein the metallic nanoparticles have an average size from 1 to 200 nm.

6. The colored glass particles of claim 1, wherein the colorant comprises at least one metal oxide.

7. The colored glass particles of claim 1, wherein the colored glass platelets are present in a particle distribution relative to the diameter of the glass platelets, the proportion of the planar glass platelets in the fraction $\geq D_{30}$ to $D_{100}$ of the particle distribution being at least 50%, based on the number of all the glass platelets in the fraction $\geq D_{30}$ to $D_{100}$.

8. The colored glass particles of claim 7, wherein the particle distribution has a $D_{10} \geq 1$ µM and a $D_{90} \leq 500$ µm.

9. The colored glass particles of claim 1, wherein the colored glass platelets have an average thickness of 30 to 3000 nm.

10. The colored glass particles of claim 1, wherein the colored glass platelets contain 30% to 80% by weight of silicon oxide, based on the total weight of the colored glass platelets.

11. The colored glass particles of claim 1, wherein the amount of alkali metal oxides in the glass platelets is from 0% to 15% by weight.

12. The colored glass particles of claim 1, wherein the colored glass platelets have at least one coating.

13. The colored glass particles of claim 12, wherein the at least one coating comprises at least one material selected from the group consisting of metals, metal chalcogenides, metal fluorides, metal nitrides, metal carbides, and also mixtures thereof and combinations thereof.

14. A method for the production of colored glass particles according to claim 1, wherein the method comprises the following steps:
(a) contacting glass particles containing alkali metal oxide with a coloring metal salt melt, the coloring metal salt melt comprising at least one coloring metal salt and at least one agent which lowers the melting point of the coloring metal salt, wherein the temperature of the coloring metal salt melt is below the melting temperature of the glass particles, for a sufficient time to give colored glass particles,
(b) removing the colored glass particles obtained in step (a) from the coloring metal salt melt,
(c) optionally washing the colored glass particles removed in step (b),
(d) optionally drying the colored glass particles washed in step (c),
(e) optionally heating the colored glass particles obtained in step (b), (c) or (d), and
(f) optionally cooling and washing the colored glass particles heated in step (e).

15. The method of claim 14, wherein the coloring metal salt melt used in step (a) comprises at least one coloring metal salt and wherein the agent lowering the melting point of the coloring metal salt comprises at least one noncoloring metal salt.

16. The method of claim 14, wherein the coloring metal salt comprises ions selected from the group consisting of gold, silver, copper, iron, cobalt, chromium, selenium, nickel, manganese, and mixtures thereof.

17. The method of claim 14, wherein the coloring metal salt contains anions selected from the group consisting of sulfates, sulfides, nitrates, nitrites, halides, oxides, and mixtures thereof.

18. The method of claim 14, wherein the coloring metal salt is selected from the group consisting of $AgNO_3$, $CuCl_2$, $CuBr_2$, $CuI_2$, $AgCl$, $AgBr$, $AgI$, $CuSO_4$, $CoSO_4$, $AG_2SO_4$, $CoCl_2$, $HAuCl_4$, $KAuCl_4$, and mixtures thereof.

19. The method of claim 14, wherein the coloring metal salt is selected from the group consisting of $Na_2Cr_2O_7$, $FeCl_3$, $FeSO_4$, and mixtures thereof.

20. The method of claim 15, wherein the noncoloring metal salt is selected from the group consisting of sodium nitrate ($Na_2NO_3$), sodium sulfate ($Na_2SO_4$), sodium chloride (NaCl), lithium chloride (LiCl), potassium chloride (KCl), and mixtures thereof.

21. The method of claim 14, wherein step (a) is carried out under inert gas atmosphere or under a reactive gas composition.

22. The method of claim 14, wherein the glass particles comprise glass platelets.

23. The method of claim 22, wherein the colored glass platelets are planar.

24. The method of claim 23, wherein the colored glass platelets are present in a particle distribution relative to the diameter of the glass platelets, and wherein the proportion of the planar glass platelets in the fraction $\geq D_{30}$ to $D_{100}$ of the particle distribution is at least 50%, based on the number of all the glass platelets in the fraction $\geq D_{30}$ to $D_{100}$.

25. The method of claim 24, wherein the particle distribution has a $D_{10} \geq 1$ µm and a $D_{90} \leq 500$ µm.

26. The method of claim 22, wherein the colored glass platelets have an average thickness of 30 to 3000 nm.

27. The method of claim 14, wherein the colored glass particles are provided with at least one further coating.

28. A composition wherein the composition includes or contains the colored glass particles of claim 1.

29. An article wherein the article is provided with colored glass particles according to claim 1.

30. The colored glass particles of claim 1, wherein the concentration profile of colorant in the colored glass platelet over the thickness of the colored glass platelet is less than 5% by weight in the interior of the glass platelet relative to a marginal region of the glass platelet.

31. The colored glass particles of claim 1, wherein the concentration profile of colorant in the colored glass platelet over the thickness of the colored glass platelet is constant in the interior of the glass platelet relative to a marginal region of the glass platelet.

32. The colored glass particles of claim 2, wherein the concentration profile of colorant on the colored glass platelet over the thickness of the colored glass platelet increases in the interior of the glass platelet relative to a marginal region of the glass platelet.

33. The colored glass particles of claim 11, wherein the amount of alkali metal oxides in the glass platelets is from 0.1% to 12% by weight.

34. The colored glass particles of claim 11, wherein the amount of alkali metal oxides in the glass platelets is from 0.2% to 8% by weight.

35. The colored glass particles of claim 13, wherein the metal chalcogenide is selected from the group consisting of metal oxides, metal hydrides, metal suboxides, metal oxide hydrates and metal sulfides.

36. The method of claim 16, wherein the ions are cations.

37. The method of claim 27, wherein said at least one further coating comprises an enveloping coating.

38. The composition of claim 28, wherein the composition is selected from the group consisting of an effect pigment, paint, printing ink, varnish, coating material, powder coating material, plastic, ceramic, decorative cosmetic, care cosmetic, agricultural film, food packaging, jewelry, art object and a decorative article.

39. An article, wherein the article is provided with a composition according to claim 28.

* * * * *

UNITED STATES PATENT AND TRADEMARK OFFICE
CERTIFICATE OF CORRECTION

PATENT NO. : 8,709,148 B2  Page 1 of 1
APPLICATION NO. : 13/131344
DATED : April 29, 2014
INVENTOR(S) : Trummer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 80 days.

Signed and Sealed this

Twenty-ninth Day of September, 2015

Michelle K. Lee
*Director of the United States Patent and Trademark Office*